US012581087B2

(12) United States Patent (10) Patent No.: US 12,581,087 B2
Yuan et al. (45) Date of Patent: Mar. 17, 2026

(54) ENCODING METHOD, DECODING METHOD, BITSTREAM, ENCODER, DECODER AND STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Dongran Jiang, Dongguan (CN); Yanhan Chu, Dongguan (CN); Ye Yang, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 93 days.

(21) Appl. No.: 18/520,922

(22) Filed: Nov. 28, 2023

(65) Prior Publication Data

US 2024/0098271 A1 Mar. 21, 2024

Related U.S. Application Data

(63) Continuation of application No. PCT/CN2021/096818, filed on May 28, 2021.

(51) Int. Cl.
*H04N 19/137* (2014.01)
*H04N 19/176* (2014.01)
(Continued)

(52) U.S. Cl.
CPC ......... *H04N 19/137* (2014.11); *H04N 19/176* (2014.11); *H04N 19/517* (2014.11); *H04N 19/70* (2014.11)

(58) Field of Classification Search
CPC .. H04N 19/137; H04N 19/176; H04N 19/517; H04N 19/70; H04N 19/117; H04N 19/42; H04N 19/59
See application file for complete search history.

(56) References Cited

U.S. PATENT DOCUMENTS

2008/0198934 A1 8/2008 Hong
2012/0063515 A1 3/2012 Panchal
(Continued)

FOREIGN PATENT DOCUMENTS

CN 109729363 A 5/2019
CN 111010568 A 4/2020
CN 111586415 A 8/2020

OTHER PUBLICATIONS

Bull, David et al. "Description of SDR video coding technology proposal by University of Bristol", Joint Video Experts Team (JVET) of ITU-T SG 16 WP 3 and ISO/IEC JTC 1/SC 29/WG 11, 10th Meeting: San Diego, US, Apr. 10-20, 2018, JVET-J0031-v3, Apr. 20, 2018 (Apr. 20, 2018), entire document. 35 pages.
(Continued)

*Primary Examiner* — Hesham K Abouzahra
(74) *Attorney, Agent, or Firm* — BAYES PLLC

(57) ABSTRACT

An encoding method includes: a first matching block of a current block is determined; motion compensation enhancement is performed on the first matching block to obtain at least one second matching block; motion information of the current block is determined according to the at least one second matching block; and the current block is encoded according to the motion information.

22 Claims, 7 Drawing Sheets

(51) Int. Cl.
    H04N 19/517         (2014.01)
    H04N 19/70         (2014.01)

(56)            References Cited

U.S. PATENT DOCUMENTS

| | | |
|---|---|---|
| 2020/0053384 A1 | 2/2020 | Zhang |
| 2021/0227243 A1* | 7/2021 | Wu ..................... H04N 19/176 |
| 2021/0235113 A1 | 7/2021 | Zhang |

OTHER PUBLICATIONS

International Search Report in the international application No. PCT/CN2021/096818, mailed on Feb. 28, 2022. 7 pages with English translation.

Written Opinion of the International Search Authority in the international application No. PCT/CN2021/096818, mailed on Feb. 28, 2022. 6 pages with English translation.

Supplementary European Search Report in the European application No. 21942383.7, mailed on Mar. 11, 2025. 14 pages.

Zhang Han et al: "Compression Priors Assisted Convolutional Neural Network for Fractional Interpolation", IEEE Transactions on Circuits and Systems for Video Technology, IEEE, USA, vol. 31, No. 5, Jul. 22, 2020 (Jul. 22, 2020), pp. 1953-1967, XP011853001, ISSN: 1051-8215, DOI: 10.1109/TCSVT.2020.3011197, paragraph [000I]-paragraph [0III], figures 1-3.

Zhao Lei et al: "Enhanced Motion-Compensated Video Coding With Deep Virtual Reference Frame Generation", IEEE Transactions on Image Processing, IEEE, USA, vol. 28, No. 10, Oct. 1, 2019 (Oct. 1, 2019), pp. 4832-4844, XP011738214, ISSN: 1057-7149, DOI: 10.1109/TIP.2019.2913545, paragraph [00II]-paragraph [00IV], figures 3-5, 7.

Li Tianyi Bt al: "A Deep Learning Approach for Multi-Frame In-Loop Filter of HEVC", IEEE Transactions on Image Processing, IEEE, USA, vol. 28, No. 11, Nov. 1, 2019 (Nov. 1, 2019), pp. 5663-5678, XP011743001, ISSN: 1057-7149, DOI: 10.1109/TIP.2019.2921877, paragraph [0III]-paragraph [000V], figures 6-10.

Dingyi Li et al: "Video Superresolution via Motion Compensation and Deep Residual Learning", IEEE Transactions on Computational Imaging, vol. 3, No. 4, Dec. 1, 2017 (Dec. 1, 2017), pp. 749-762, XP055610437, DOI: 10.1109/TCI.2017.2671360, paragraph [ 0III]; figures 1-2.

Yang Ren et al: "Multi-frame Quality Enhancement for Compressed Video", 2018 IEEE/CVF Conference on Computer Vision and Pattern Recognition, IEEE, Jun. 18, 2018 (Jun. 18, 2018), pp. 6664-6673, XP033473584, DOI: 10.1109/CVPR.2018.00697, paragraph [0001]-paragraph [0004]; figures 4-6.

* cited by examiner

| $A_{-1,-1}$ | | | | $A_{0,-1}$ | $a_{0,-1}$ | $b_{0,-1}$ | $c_{0,-1}$ | $A_{1,-1}$ | | | $A_{2,-1}$ |
|---|---|---|---|---|---|---|---|---|---|---|---|
| | | | | | | | | | | | |
| | | | | | | | | | | | |
| | | | | | | | | | | | |
| $A_{-1,0}$ | | | | $A_{0,0}$ | $a_{0,0}$ | $b_{0,0}$ | $c_{0,0}$ | $A_{1,0}$ | | | $A_{2,0}$ |
| $d_{-1,0}$ | | | | $d_{0,0}$ | $e_{0,0}$ | $f_{0,0}$ | $g_{0,0}$ | $d_{1,0}$ | | | $d_{2,0}$ |
| $h_{-1,0}$ | | | | $h_{0,0}$ | $i_{0,0}$ | $j_{0,0}$ | $k_{0,0}$ | $h_{1,0}$ | | | $h_{2,0}$ |
| $n_{-1,0}$ | | | | $n_{0,0}$ | $p_{0,0}$ | $q_{0,0}$ | $r_{0,0}$ | $n_{1,0}$ | | | $n_{2,0}$ |
| $A_{-1,1}$ | | | | $A_{0,1}$ | $a_{0,1}$ | $b_{0,1}$ | $c_{0,1}$ | $A_{1,1}$ | | | $A_{2,1}$ |
| | | | | | | | | | | | |
| | | | | | | | | | | | |
| | | | | | | | | | | | |
| $A_{-1,2}$ | | | | $A_{0,2}$ | $a_{0,2}$ | $b_{0,2}$ | $c_{0,2}$ | $A_{1,2}$ | | | $A_{2,2}$ |

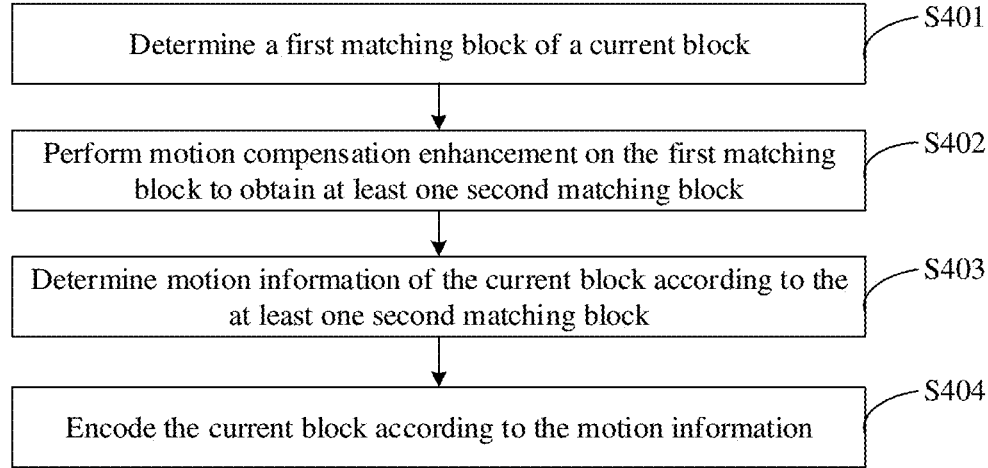

Determine a first matching block of a current block — S401

Perform motion compensation enhancement on the first matching block to obtain at least one second matching block — S402

Determine motion information of the current block according to the at least one second matching block — S403

Encode the current block according to the motion information — S404

FIG. 4

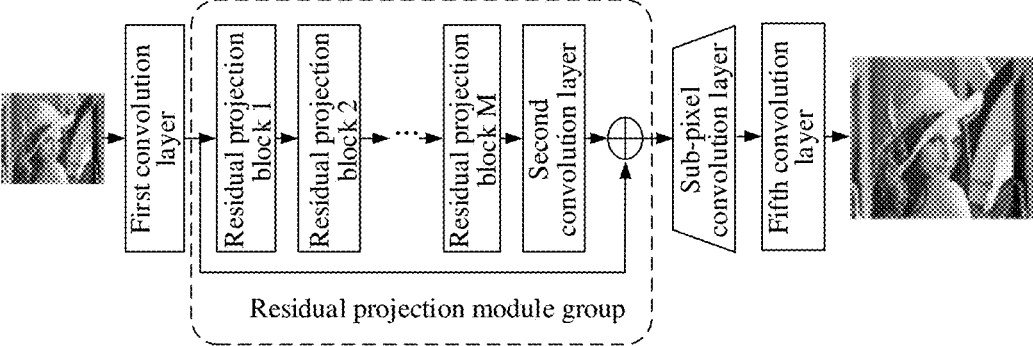

First convolution layer

Residual projection block 1

Residual projection block 2

Residual projection block M

Second convolution layer

Sub-pixel convolution layer

Fifth convolution layer

Residual projection module group

FIG. 5

ENCODING METHOD, DECODING METHOD, BITSTREAM, ENCODER, DECODER AND STORAGE MEDIUM

CROSS-REFERENCE TO RELATED APPLICATION

This application is a continuation of International Patent Application No. PCT/CN2021/096818, filed on May 28, 2021, which is incorporated herein by reference in its entirety.

TECHNICAL FIELD

This application is a continuation of International Application No. PCT/CN2021/096818 filed on May 28, 2021, the disclosure of which is hereby incorporated by reference in its entirety.

BACKGROUND

In the technical field of video processing, an intra prediction mode and an inter prediction mode can be used for encoding and decoding a current block. The fractional pixel motion compensation technology is the key technology to improve the compression efficiency by eliminating temporal redundancy of a video, which is mainly used in motion compensation and motion estimation of the inter prediction.

At present, for half-precision fractional pixel motion compensation, although there are some fractional pixel motion compensation technical schemes, when the non-stationary of the natural picture signal and the nonlinearity of encoding noise are taken into consideration, the existing technical schemes still have some defects, especially they are difficult to adapt to the increasingly diversified video contents and complex encoding environment, resulting in low encoding and decoding efficiency.

SUMMARY

The present disclosure relates to the technical field of video processing, and in particular to an encoding method, a decoding method, a bitstream, an encoder, a decoder and a storage medium.

The embodiments of the present disclosure provide an encoding method, a decoding method, a bitstream, an encoder, a decoder and a storage medium, which can save the bit rate on the premise of ensuring the same decoding quality, thus improving the encoding and decoding efficiency.

The technical schemes of the embodiment of the present disclosure can be implemented as follows.

In a first aspect, the embodiments of the present disclosure provide an encoding method. The method is applied to an encoder, and the method includes the following operations. A first matching block of a current block is determined. Motion compensation enhancement is performed on the first matching block to obtain at least one second matching block. Motion information of the current block is determined according to the at least one second matching block. The current block is encoded according to the motion information.

In the second aspect, the embodiments of the present disclosure provide a bitstream. The bitstream is generated by bit encoding according to information to be encoded. The information to be encoded at least includes motion information of a current block, a residual block of the current block and a value of first syntax element identification information. The first syntax element identification information is for indicating whether to use motion compensation enhancement processing mode for the current block.

In a third aspect, the embodiments of the present disclosure provide a decoding method. The method is applied to a decoder, and the method includes the following operations. A bitstream is parsed to determine a value of first syntax element identification information. In response to the first syntax element identification information indicating using a motion compensation enhancement processing mode for a current block, the bitstream is parsed to determine first motion information of the current block. A first matching block of the current block is determined according to the first motion information, and motion compensation enhancement is performed on the first matching block to obtain at least one second matching block. A first prediction block of the current block is determined according to the first motion information and at least one second matching block. A reconstruction block of the current block is determined according to the first prediction block.

BRIEF DESCRIPTION OF THE DRAWINGS

FIG. 4 is a schematic flowchart of an encoding method provided by an embodiment of the present disclosure.

FIG. 5 is a schematic diagram of a network structure of a preset neural network model provided by an embodiment of the present disclosure.

DETAILED DESCRIPTION

In order to have a more detailed understanding of the features and technical contents of the embodiments of the present disclosure, the implementation of the embodiments of the present disclosure will be described in detail below in combination with the accompanying drawings, which are for reference only and are not intended to limit the embodiments of the present disclosure.

Unless otherwise defined, all technical and scientific terms used herein have the same meaning as would normally be understood by those skilled in the art of the present disclosure. The terms used herein are only for the purpose of describing embodiments of the present disclosure, and are not intended to limit the present disclosure.

In the following description, reference is made to "some embodiments" that describe subsets of all possible embodiments, but it is understood that "some embodiments" may be the same subset or different subsets of all possible embodiments, and may be combined with each other without conflict. It is also to be noted that the term "first\second\third" referred to in embodiments of the present disclosure is used only to distinguish similar objects and does not represent a particular order for objects, and it is understood that "first\second\third" may be interchanged in a particular order or priority order where permissible to enable embodiments of the present disclosure described herein to be implemented in an order other than that illustrated or described herein.

In a video picture, a first colour component, a second colour component and a third colour component are generally used to characterize a Coding Block (CB). The three colour components are respectively a luma component, a blue chroma component and a red chroma component. In particular, the luma component is generally represented by the symbol Y, the blue chroma component is generally represented by the symbol Cb or U, and the red chroma component is generally represented by the symbol Cr or V. In this way, the video picture may be expressed in YCbCr format or YUV format.

Prior to further detailed description of the embodiments of the present disclosure, the nouns and terms involved in the embodiments of the present disclosure will be explained, and the nouns and terms involved in the embodiments of the present disclosure are applicable for the following interpretations.

Moving Picture Experts Group (MPEG)
International Standardization Organization (ISO)
International Electrotechnical Commission (IEC)
Joint Video Experts Team (JVET)
Alliance for Open Media (AOM)
New Generation Video Coding Standard H.266/Versatile Video Coding (VVC)
VVC Test Model (VTM)
Coding Unit (CU)
Coding Tree Unit (CTU)
Prediction Unit (PU)
Discrete Cosine Transform (DCT)
Interpolation Filter based on Discrete Cosine Transform (DCTIF)
Residual Projection Block (RPB)
Residual Projection Network (RPN)
Peak Signal to Noise Ratio (PSNR)

Figures 1, 2:
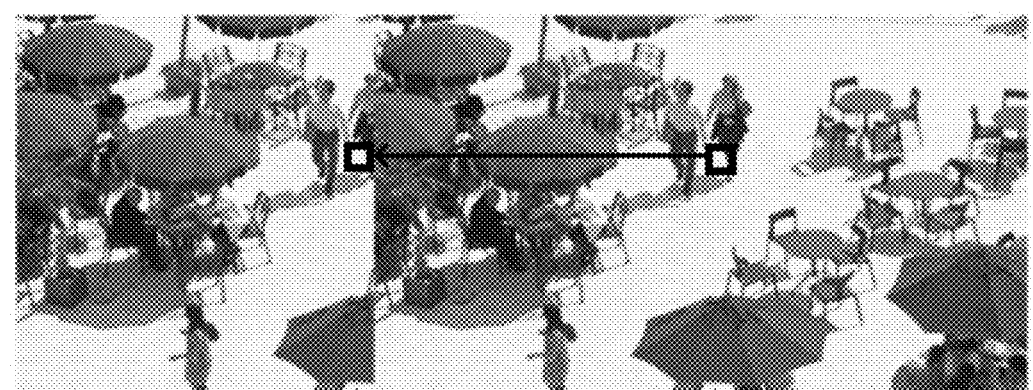
FIG. 1 is a schematic diagram of an expression of the inter prediction provided by an embodiment of the present disclosure.
FIG. 2 is a fractional position diagram of a luma component with sub-pixel precision provided by an embodiment of the present disclosure.

As can be appreciated, in the field of video processing technology, the fractional pixel motion compensation technology is the key technology to improve compression efficiency by eliminating temporal redundancy of a video, which is mainly used in motion compensation and motion estimation of inter prediction. Herein, the inter prediction is a process of predicting the current picture by using a decoded and reconstructed reference picture, and its core is to acquire the best matching block (also called "optimal matching block") from the reference picture through motion compensation according to the motion information of the current block. The motion information may include a prediction direction, an index sequence number of a reference picture, and a motion vector. Referring to FIG. 1, a schematic diagram of an expression of the inter prediction provided by an embodiment of the present disclosure is illustrated. As illustrated in FIG. 1, the encoder uses a search algorithm to find a best matching block for a current block to be encoded in the current picture, and the displacement between the two blocks is called motion vector. This process is called motion estimation.

Specifically, the encoder firstly needs to perform integer-pixel motion estimation to obtain a best matching block at an integer pixel position. In order to further improve the prediction precision, the concept of fractional pixel motion compensation is proposed. The so-called fractional pixel motion compensation is to interpolate the best matching blocks at the integer pixel positions through an interpolation filter, and generate half-precision sub-pixel samples and quarter-precision sub-pixel samples. FIG. 2 illustrates a diagram showing fractional positions of a luma component with sub-pixel precision provided by an embodiment of the present disclosure. In FIG. 2, the capital letters represent integer pixel samples. That is, $A_{i,j}$ represents a pixel at an integer position. The lowercase letters represent sub-pix samples. Herein, $b_{i,j}$, $h_{i,j}$ and $j_{i,j}$ represent sub-pixels at half-precision positions, and the remaining lowercase letters represent sub-pixels at quarter-precision positions.

That is to say, the essence of the fractional pixel motion compensation is to further optimize the matching blocks at the integer pixel positions by interpolation filtering, where the main functions of the interpolation filter include removing spectrum aliasing caused by digital sampling, and suppressing encoding noise in the reference picture. However, for half-precision fractional pixel motion compensation, when the non-stationary of natural picture signal and the nonlinearity of encoding noise are taken into consideration, the existing technical schemes still have some defects, especially they are difficult to adapt to the increasingly diversified video contents and complex encoding environment, resulting in low encoding and decoding efficiency.

The embodiments of the present disclosure provide an encoding method, which includes the following operations. A first matching block of a current block is determined. Motion compensation enhancement is performed on the first matching block to obtain at least one second matching block. Motion information of the current block is determined according to the at least one second matching block. The current block is encoded according to the motion information.

The embodiments of the present disclosure provide a decoding method, which includes the following operations. A bitstream is parsed to determine a value of first syntax element identification information. If the first syntax element identification information indicates using a motion compensation enhancement processing mode for a current block, the bitstream is parsed to determine first motion information of the current block. A first matching block of the current block is determined according to the first motion information, and motion compensation enhancement is performed on the first matching block to obtain at least one second matching block. A first prediction block of the current block is determined according to the first motion information and at least one second matching block. A reconstruction block of the current block is determined according to the first prediction block.

In this way, for both the encoder and the decoder, by performing motion compensation enhancement on the first matching block, not only diversified video contents and complex encoding environment can be adapted, but also the computational complexity can be reduced and the bit rate can be saved on the premise of ensuring the same decoding quality, thus improving the encoding and decoding efficiency.

The embodiments of the present disclosure will be described in detail below with reference to the accompanying drawings.

Figure 3A:
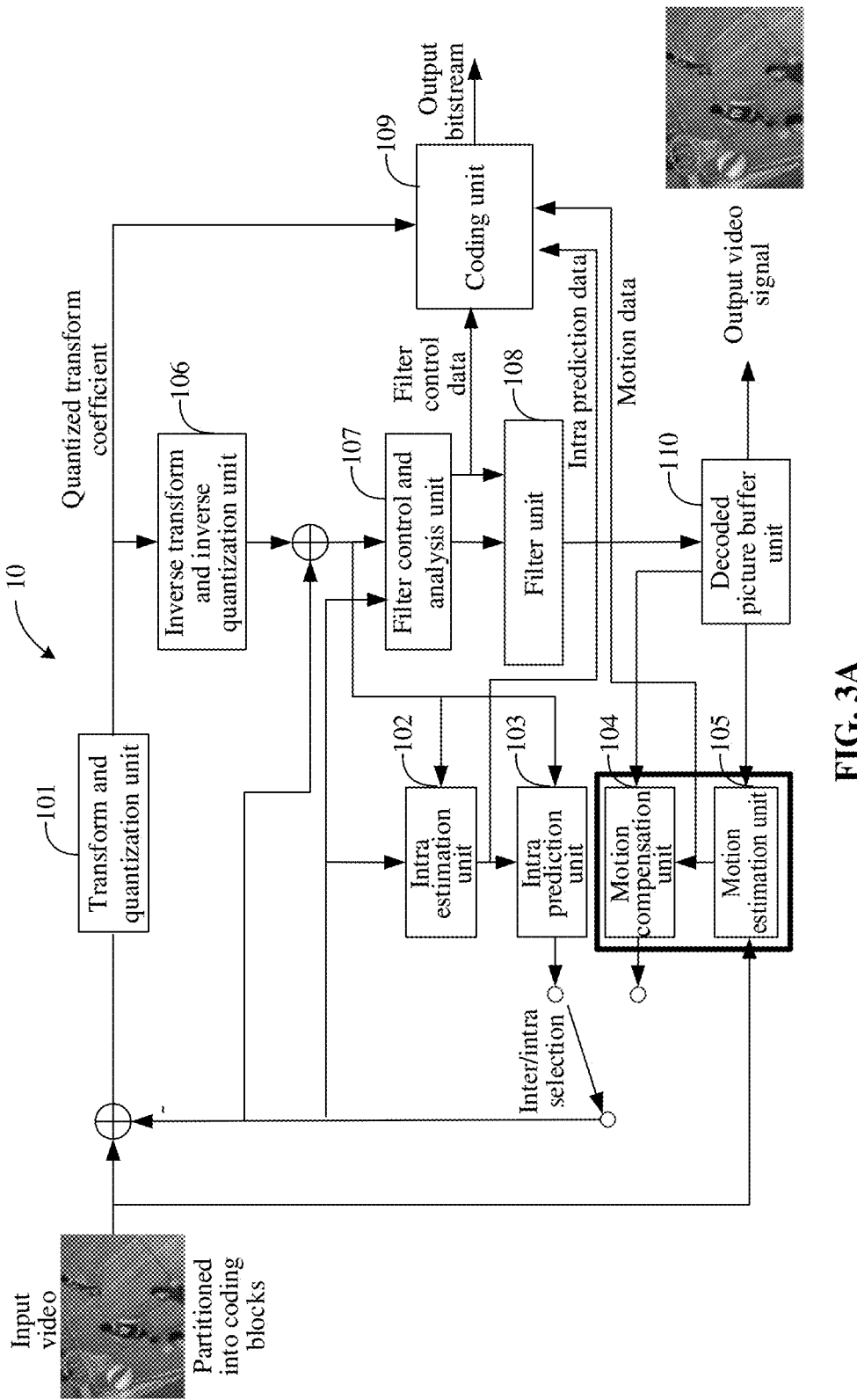
FIG. 3A is a block diagram of a video encoding system provided by an embodiment of the present disclosure.

Referring to FIG. 3A, a block diagram of a video encoding system provided by an embodiment of the present disclosure is illustrated. As illustrated in FIG. 3A, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control and analysis unit 107, a filter unit 108, a coding unit 109 and a decoded picture buffer unit 110, etc. The de-block filtering and Sample Adaptive Offset (SAO) filtering may be implemented by the filter unit 108. The header information encoding and Context-based Adaptive Binary Arithmetic Coding (CABAC) can be implemented by the coding unit 109. For an input original video signal, a video encoded block may be obtained by partition into a Coding Tree Unit (CTU), and then the video encoded block is transformed by the transform and quantization unit 101 using residual pixel information obtained after intra or inter prediction, which includes transforming the residual information from a pixel domain to a transform domain; and the obtained transform coefficient is quantized to further reduce the bit rate. The intra estimation unit 102 and the intra prediction unit 103 are used for performing intra prediction on the video encoded block. Specifically, the intra estimation unit 102 and the intra prediction unit 103 are used for determining an intra prediction mode to be used to encode the video encoded block. The motion compensation unit 104 and the motion estimation unit 105 are used for performing inter prediction encoding of the received video encoded blocks with respect to one or more blocks of the one or more reference pictures to provide temporal prediction information. Motion estimation performed by the motion estimation unit 105 is a process of generating motion vectors that may be used to estimate the motion of the video encoded block, and then motion compensation is performed by the motion compensation unit 104 based on the motion vectors determined by the motion estimation unit 105. After the intra prediction mode is determined, the intra prediction unit 103 is further used for providing the selected intra prediction data to the coding unit 109, and the motion estimation unit 105 also transmits the motion vector data determined by calculating to the coding unit 109. In addition, the inverse transform and inverse quantization unit 106 is used for the reconstruction of the video encoded block, and the residual block is reconstructed in the pixel domain. Blocking artifacts of the reconstructed residual block are removed by the filter control and analysis unit 107 and the filter unit 108, and then the reconstructed residual block is added to a predictive block in the picture of the decoded picture buffer unit 110 to generate a reconstructed video encoded block. The coding unit 109 is used for encoding various encoding parameters and quantized transform coefficients. In the CABAC-based encoding algorithm, the context content may be based on neighbouring coding blocks, and may be used for encoding information indicating the determined intra prediction mode to output a bitstream of the video signal. The decoded picture buffer unit 110 is used for storing the reconstructed video encoded block for prediction reference. As video picture encoding proceeds, new reconstructed video encoded blocks are continuously generated, and all of these

6 reconstructed video encoded blocks are stored in the decoded picture buffer unit 110.

Figure 3B:
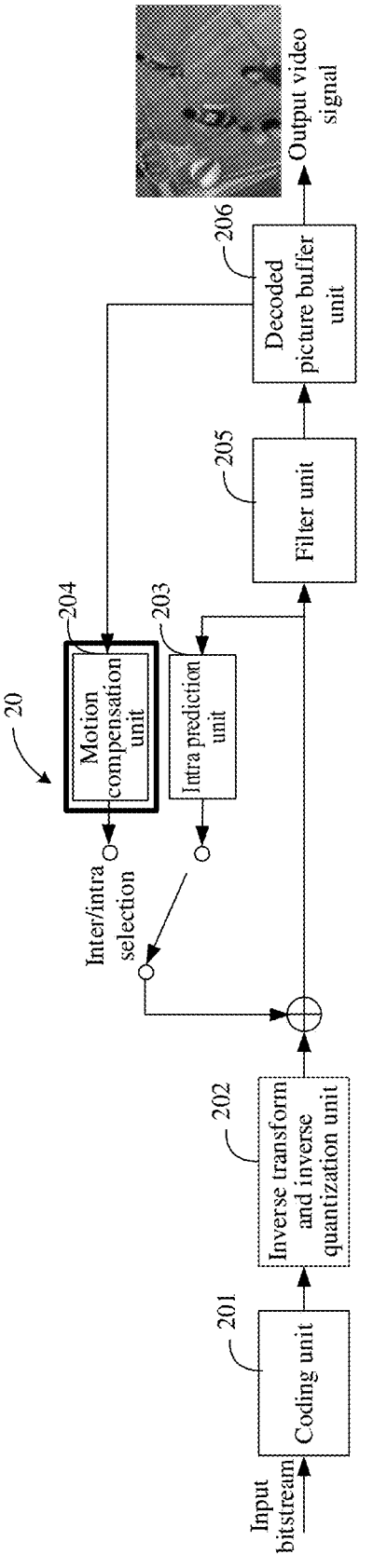
FIG. 3B is a block diagram of a video decoding system provided by an embodiment of the present disclosure.

Referring to FIG. 3B, a block diagram of a video decoding system provided by an embodiment of the present disclosure is illustrated. As illustrated in FIG. 3B, the video decoding system 20 includes a coding unit 201, an inverse transform and inverse quantization unit 202, an intra prediction unit 203, a motion compensation unit 204, a filter unit 205, a decoded picture buffer unit 206, etc. The header information decoding and CABAC decoding may be implemented by the coding unit 201. The de-block filtering and SAO filtering may be implemented by the filter unit 205. After the input video signal is encoded in FIG. 3A, a bitstream of the video signal is output. The bitstream is input into the video decoding system 20, and firstly passes through the coding unit 201 to obtain decoded transform coefficients. The transform coefficients are processed by the inverse transform and inverse quantization unit 202 to generate a residual block in the pixel domain. The intra prediction unit 203 may be used for generating prediction data for a current video coding block based on the determined intra prediction mode and data from previously decoded blocks of the current picture. The motion compensation unit 204 is used for determining prediction information for the video coding block by parsing motion vectors and other associated syntax elements and using the prediction information to generate a predictive block for the video coding block being decoded. A decoded video block is formed by summing the residual block from the inverse transform and inverse quantization unit 202 and the corresponding predictive block generated by the intra prediction unit 203 or the motion compensation unit 204. The blocking artifacts of the decoded video signal are removed by the filter unit 205, and the video quality can be improved. The decoded video block is then stored in the decoded picture buffer unit 206, which stores a reference picture for subsequent intra prediction or motion compensation, while also being used for output of the video signal, that is, the restored original video signal is obtained.

It is to be noted that the embodiments of the present disclosure may be applied to an inter prediction portion of the video encoding system 10 (which may be simply referred to as an "encoder"), and the inter prediction portion is specifically the motion compensation unit 104 and the motion estimation unit 105 as illustrated in FIG. 3A. The embodiments of the present disclosure may also be applied to an inter prediction portion of the video decoding system 20 (which may be simply referred to as a "decoder"), and the inter prediction portion is specifically the motion compensation unit 204 as illustrated in FIG. 3B. That is to say, the embodiments of the present disclosure may be applied to the encoder and also to the decoder, or even to both the encoder and the decoder simultaneously, which is not specifically limited herein.

It is also to be noted that when the method of an embodiment of the present disclosure is applied to the encoder, the "current block" specifically refers to a coding block currently to be subjected to inter prediction in a picture to be encoded. When the method of an embodiment of the present disclosure is applied to a decoder, the "current block" specifically refers to a coding block currently to be subjected to inter prediction in a picture to be decoded.

In an embodiment of the present disclosure, referring to FIG. 4, a schematic flowchart of an encoding method provided by an embodiment of the present disclosure is illustrated. As illustrated in FIG. 4, the method may include the following operations.

In operation S401, a first matching block of a current block is determined.

It is to be noted that for a video picture, the video picture may be partitioned into multiple picture blocks, and each picture block to be encoded may be referred to as a coding block. The current block here specifically refers to the coding block currently to be subjected to inter prediction. The current block may be a CTU, even a CU, a PU, etc., which is not limited in the embodiments of the present disclosure.

It is also to be noted that the encoding method in the embodiment of the present disclosure is mainly applied to the motion estimation and motion compensation parts of the inter prediction. The motion compensation is to predict and compensate a current local picture by using a local picture in a decoded and reconstructed reference picture, which may reduce the redundant information of the moving picture. The motion estimation is to extract motion information from a video sequence, that is, to estimate information about an offset of a moving object between the reference picture and the current picture, that is, the motion information described in the embodiments of the present disclosure. This process is referred to as the motion estimation.

In the embodiment of the present disclosure, the first matching block here may be obtained according to integer pixel motion estimation, and may also be obtained by using sub-pixel interpolation filtering in the related technologies, which is not limited in the embodiments of the present disclosure.

Taking the integer pixel motion estimation as an example, in a specific example, the operation of determining the first matching block of the current block may include the following operation.

Integer pixel motion estimation is performed on the current block to determine the first matching block of the current block.

Specifically, the integer pixel motion estimation is performed on the current block to determine a target matching block of the current block at the integer pixel position, and the target matching block at the integer pixel position is determined as the first matching block. The target matching block (or "first matching block") at the integer pixel position is a matching block with a minimum rate distortion cost when motion estimation is performed on the current block at integer pixel positions.

In the embodiment of the present disclosure, motion estimation methods mainly include a pixel recursion method and a block matching method. The former has high complexity and is seldom used in practice. The latter is widely used in video coding standards. Specifically, the block matching method mainly includes a block matching criterion and a search method. At present, there are three commonly used matching criteria: (1) Sum Absolute Difference (SAD) criterion; (2) Mean Square Error (MSE) criterion; (3) Normalized Cross Correlation Function (NCCF) criterion. After the matching criterion is determined, the search for the best matching block is needed to be performed, for example, full search method, three-step search method, diamond search method or the like can be used.

In the process of the integer pixel motion estimation, for multiple matching blocks at integer pixel positions, the rate distortion cost corresponding to a matching block at each integer pixel position is needed to be calculated, and then the matching block at the integer pixel position with the minimum rate distortion cost, that is, the best matching block or the target matching block described in the embodiment of the present disclosure, is selected. That is, the target matching block at the integer pixel position is a matching block, corresponding to the minimum rate distortion cost, selected from the multiple matching blocks at the integer pixel positions.

In operation S402, motion compensation enhancement is performed on the first matching block to obtain at least one second matching block.

It is to be noted that after the first matching block is obtained, in order to further improve the prediction precision, in the embodiment of the present disclosure, the motion compensation enhancement may be performed.

In one possible embodiment, for the motion compensation enhancement, a DCTIF is typically used in video coding standards for half-precision sub-pixel sample interpolation. The basic idea is that the direct transform is performed on the integer pixel samples to cause the integer pixel samples to be into the DCT domain, and then inverse transform is performed on the DCT coefficient to cause the DCT coefficient to be back into the spatial domain by using DCT bases sampled at the target sub-pixel positions. This process may be represented by a finite impulse response filtering process. It is assumed that a given pixel is represented as f(i), and the pixel obtained by the interpolation is represented as $\hat{f}(s)$, then the mathematical form of the DCTIF interpolation process is illustrated in Equation (1).

$$\hat{f}(s) = \sum_{i=0}^{M-1} f(i) \sum_{u=0}^{M-1} a^2(u) C_{2M}^{(2s+1)u} C_{2M}^{(2i+1)u} \tag{1}$$

In the Equation (1), $$a(u) = \begin{cases} \sqrt{\dfrac{1}{M}}, & \text{if } u = 0 \\ \sqrt{\dfrac{2}{M}}, & \text{else if } u \neq 0 \end{cases} \tag{2}$$

$$C_K^l = \cos\left(\frac{\pi l}{k}\right) \tag{3}$$

Based on the basic principle of the DCTIF, in practical application, the tap coefficient of the interpolation filter for half-precision sub-pixel samples may be $[-1, 4, -11, 40, 40, -11, 4, -1]$.

In this embodiment, for the half-precision fractional pixel motion compensation, when the non-stationary of the natural picture signal and the nonlinearity of the encoding noise are taken into consideration, if the fixed-tap-based linear interpolation filter DCTIF is adopted, it will be difficult to adapt to the increasingly diversified video contents and the complex encoding environment.

In another possible embodiment, for the motion compensation enhancement, the embodiment of the present disclosure provides a motion compensation enhancement processing mode based on a preset neural network model. Specifically, in some embodiments, the operation of performing motion compensation enhancement on the first matching block may further include: the motion compensation enhancement is performed on the first matching block by using the preset neural network model.

Accordingly, the operation of performing the motion compensation enhancement on the first matching block to obtain the at least one second matching block may include the following operations.

Super-resolution and quality enhancement processing is performed on the first matching block by using the preset neural network model to obtain a processed block.

First filtering processing is performed on the processed block to obtain the at least one second matching block.

It is to be noted that a resolution of the processed block is higher than a resolution of the current block. Or, in other words, the processed block obtained after the super-resolution and quality enhancement processing has performances of high quality and high resolution.

It is also to be noted that a resolution of the first matching block is the same as the resolution of the current block, and a resolution of the second matching block obtained after the first filtering processing is the same as the resolution of the current block.

Further, in some embodiments, the first filtering processing may include down-sampling. That is, after the processed block is obtained, down-sampling is performed on the processed block to obtain the at least one second matching block.

In a specific example, if the first matching block is an integer pixel matching block, the operation of performing the motion compensation enhancement on the first matching block by using the preset neural network model to obtain the at least one second matching block may include the following operation.

Fractional pixel motion compensation is performed on the first matching block by using the preset neural network model to obtain the at least one second matching block.

Herein, if the first matching block is an integer pixel matching block, then in one possible embodiment, the precision of the second matching block is half-precision, and the number of the second matching blocks is four. In another possible embodiment, the precision of the second matching block is quarter-precision, and the number of the second matching blocks is 16. However, the precision and the number are not limited in the embodiments of the present disclosure.

It is understood that, the preset neural network model is a Convolutional Neural Networks (CNN) model. The CNN is a kind of feedforward neural network with convolution calculation and a depth structure, and is one of the representative algorithms of deep learning. Herein, the CNN have the ability of representation learning, and can perform shift-invariant classification on input information according to their hierarchical structure, so the CNN may also be referred to as "Shift-Invariant Artificial Neural Networks (SIANN)".

That is to say, the present embodiment is different from the above-mentioned embodiment where the interpolation filter interpolates and filters the first matching block to obtain three half-precision sub-pixel samples, and the present embodiment realizes end-to-end super-resolution and quality enhancement on the first matching block by using the CNN model, and then down-sampling is performed on the output high-resolution picture to generate four half-precision sub-pixel samples (i.e., "the second matching blocks").

Further, in some embodiments, the preset neural network model may include a feature extraction module, a residual projection module group, a sampling module and a reconstruction module. The feature extraction module, the residual projection module group, the sampling module and the reconstruction module are connected in sequence.

In a specific example, based on the specific structure of the preset neural network model, the operation of performing the super-resolution and quality enhancement processing on the first matching block to obtain the processed block may include the following operations.

Shallow feature extraction is performed on the first matching block by the feature extraction module to obtain first feature information.

Residual feature learning is performed on the first feature information by the residual projection module group to obtain second feature information.

Second filtering processing is performed on the second feature information by the sampling module to obtain third feature information.

Super-resolution reconstruction is performed on the third feature information by the reconstruction module to obtain the processed block.

Herein, the feature extraction module is mainly used for shallow feature extraction, so the feature extraction module may also be referred to as "shallow feature extraction module". The shallow features in the embodiment of the present disclosure mainly refer to simple features at low levels (such as edge features, etc.).

In a specific example, the feature extraction module may include a first convolution layer. Accordingly, the operation of performing the shallow feature extraction on the first matching block by the feature extraction module to obtain the first feature information may include: convolution operation is performed on the first matching block by the first convolution layer to obtain the first feature information.

In some embodiments, the convolution kernel size of the first convolution layer is $K \times L$, the number of convolution kernels of the first convolution layer is an integer power of 2, and K and L are positive integers greater than zero. In a more specific example, the convolution kernel size of the first convolution layer may be $3 \times 3$, and the number of convolution kernels of the first convolution layer is 64. However, the convolution kernel size and the number of convolution kernels are not limited in the embodiments of the present disclosure.

Further, in a specific example, the residual projection module group may include N residual projection blocks, a second convolution layer and a first connection layer. N is an integer greater than or equal to 1.

In an embodiment of the present disclosure, the N residual projection blocks, the second convolution layer and the first connection layer are connected in sequence, and the first connection layer is further connected to an input of a first one of the N residual projection blocks.

Accordingly, the operation of performing the residual feature learning on the first feature information by the residual projection module group to obtain the second feature information includes the following operations.

The residual feature learning is performed on the first feature information by the N residual projection blocks to obtain first intermediate feature information.

Convolution operation is performed on the first intermediate feature information by the second convolution layer to obtain the second intermediate feature information.

The first feature information and the second intermediate feature information are added by the first connection layer to obtain the second feature information.

In some embodiments, the convolution kernel size of the second convolution layer is $K \times L$, the number of convolution kernels of the second convolution layer is an integer power of 2, and K and L are positive integers greater than zero. In a more specific example, the convolution kernel size of the second convolution layer is $3 \times 3$, and the number of convolution kernels of the second convolution layer is 64. However, the convolution kernel size and the number of convolution kernels are not limited in the embodiments of the present disclosure.

It is to be noted that the input of the d-th residual projection block is represented as $F_{d-1}$, and the output of the d-th residual projection block is represented as $F_d$. If better results cannot be achieved by only stacking residual projection blocks, the first connection layer, i.e., a Long Skip Connection (LSC) layer, may be introduced in this case. Even the second convolution layer is introduced after the N residual projection blocks. Through this residual learning mode, the information flow in the preset neural network model may be simplified, and the performance of the preset neural network model is more stable.

It is also to be noted that, in terms of the mode of stacking the residual projection blocks, the N residual projection blocks are in a cascaded structure, an input of the cascaded structure is the first feature information, and an output of the cascaded structure is the second intermediate feature information. In some embodiments, the operation of performing the residual feature learning on the first feature information by the N residual projection blocks to obtain the first intermediate feature information may include the following operations.

If N is equal to 1, the first feature information is input into the first residual projection block to obtain output information of the first residual projection block, and the output information of the first residual projection block is determined as the first intermediate feature information.

If N is greater than 1, after the output information of the first residual projection block is obtained, output information of a d-th residual projection block is input into a (d+1)-th residual projection block to obtain output information of the (d+1)-th residual projection block, d is incremented by 1 until output information of an N-th residual projection block is obtained, and the output information of the N-th residual projection block is determined as the first intermediate feature information, where d is an integer greater than or equal to 1 and less than N.

Herein, if N is equal to 1, that is, the residual projection module group includes only one residual projection block, the output information of this residual projection block is the first intermediate feature information. If N is greater than 1, that is, the residual projection module group includes more than two residual projection blocks, residual learning is performed in a stacking way, that is, the output of the preceding residual projection block is the input of its next residual projection block, until the output information of the last residual projection block is obtained, and then the output information of the last residual projection block is the first intermediate feature information.

Further, in one specific example, the sampling module may include a sub-pixel convolution layer. Accordingly, the operation of performing the second filtering processing on the second feature information by the sampling module to obtain the third feature information may include the following operation.

The second filtering processing is performed on the second feature information by the sub-pixel convolution layer to obtain the third feature information.

It is to be noted that a resolution of the third feature information obtained after the second filtering processing is higher than a resolution of the second feature information.

It is also to be noted that the second filtering processing may include up-sampling. That is to say, the sampling module is mainly used for up-sampling the second feature information, so the sampling module may also be referred to as the "up-sampling module".

It is also to be noted that the sampling module may use a sub-pixel convolution layer, or a sub-pixel convolution layer may be added in the sampling module. Herein, the sub-pixel convolution layer may also be a PixShuffle module (or referred to as Pixelshuffle module), which realizes the function of transforming a HxW low-resolution input picture into a rHxrW high-resolution input picture by sub-pixel operation. However, the implementation process is not to generate this high-resolution picture directly by interpolation, but to firstly obtain a feature map having $r^2$ channels by convolution (the size of the feature map is consistent with the size of the input low-resolution picture), and then to obtain this high-resolution picture by the periodic shuffling method, where r may be the magnification of the picture. Specifically, with respect to the feature map, the number of channels is $r^2$, the $r^2$ channels of each pixel are rearranged into a region of rxr, which corresponds to a sub-block with a size of rxr in the high-resolution picture, so that the feature picture with a size of $r^2 \times H \times W$ is rearranged into a high-resolution picture with a size of $1 \times rH \times rW$.

Further, in one specific example, the reconstruction module may include a fifth convolution layer. Accordingly, the operation of performing the super-resolution reconstruction on the third feature information by the reconstruction module to obtain the processed block may include the following operation.

Convolution operation is performed on the third feature information by the fifth convolution layer to obtain the processed block.

In the embodiment of the present disclosure, the convolution kernel size of the fifth convolution layer is KxL, the number of convolution kernels of the fifth convolution layer is an integer power of 2, and K and L are positive integers greater than zero. In a more specific example, the convolution kernel size of the fifth convolution layer is 3x3, and the number of convolution kernels of the fifth convolution layer is 1, which is not limited in the embodiments of the present disclosure.

Exemplarily, referring to FIG. 5, a schematic diagram of a network structure of a preset neural network model provided by an embodiment of the present disclosure is illustrated. The preset neural network model may be represented by RPNet. As illustrated in FIG. 5, the RPNet mainly includes four parts: a shallow feature extraction network layer (Shallow Feature Extraction Net), a residual projection module group (Residual Projection Blocks), an up-sampling network layer (Up-sampling Net) and a reconstruction network layer (Reconstruction Net). The Shallow Feature Extraction Net is the feature extraction module described in the embodiment of the present disclosure, which may be the first convolution layer. The Up-sampling Net is the sampling module described in the embodiment of the present disclosure, which may be the sub-pixel convolution layer. The Reconstruction Net is the reconstruction module described in the embodiment of the present disclosure, which may be the fifth convolution layer. Herein, it is assumed that $I_{LR}$ represents the first matching block described in the embodiment of the present disclosure, i.e., an input low-resolution picture of the RPNet. It is assumed that $I_{SR}$ represents the processed block described in the embodiment of the present disclosure, i.e., a high-resolution picture (also referred to as the super-resolution picture) output by the RPNet. That is, $I_{LR}$ and $I_{SR}$ represent the input and output of the RPNet, respectively. The network structure of this model will be explained in detail with reference to FIG. 5.

Firstly, in the embodiment of the present disclosure, only one convolution layer is used to perform shallow feature extraction on the input low-resolution picture, the mathematical form of which is illustrated in Equation (4), $$F_0 = H_{SFE}(I_{LR}) \tag{4}$$

Herein, $H_{SFE}(\cdot)$ represents the convolution operation, $F_0$ represents the extracted shallow feature of the low-resolution picture, which is used as the input of the residual projection module.

Secondly, it is assumed that the RPNet contains N residual projection blocks, and the computation made by the d-th residual projection block may be described by Equation (5), $$F_d = H_{RPB,d}(F_{d-1}) = H_{RPB,d}(H_{RPB,d-1}(\ldots(H_{RPB,1}(F_0))) \tag{5}$$

Herein, $F_{d-1}$ and $F_d$ represent the input and output of the d-th residual projection block, respectively. Experiences show that better results cannot be achieved by only stacking residual projection blocks. In order to solve this problem, an LSC layer is introduced herein, and its mathematical form is illustrated in Equation (6), $$F_{DF} = F_0 + W_{LSC}F_N = F_0 + W_{LSC}H_{RPB,N}(H_{RPB,N-1}(\ldots (H_{RPB,1}(F_0))\ldots)) \tag{6}$$

Herein, $W_{LSC}$ represents the weight value of the convolution layer after the N-th residual projection block. Through this mode of Global Residual Learning (GRL), the information flow in the network structure is simplified, and the network model becomes more stable in the training process. The residual information is directly learned by residual projection blocks, which makes it possible to improve the performance of the network model.

Thirdly, up-sampling is performed on the residual feature $F_{DF}$ by the Up-sampling Net, and its mathematical form is illustrated in Equation (7), $$F_{UP} = H_{UP}(F_{DF}) \tag{7}$$

Herein, $H_{UP}(\cdot)$ represents a convolution operation to implement up-sampling, and $F_{UP}$ represents extracted third feature information, which is used as an input of the Reconstruction Net.

Finally, a high-resolution picture is generated by the Reconstruction Net, and the mathematical form is illustrated in Equation (8), $$I_{SR} = H_{REC}(F_{UP}). \tag{8}$$

Herein, $H_{REC}(\cdot)$ represents a convolution operation to implement super-resolution reconstruction.

It may also be understood that when the relationship between the low-resolution feature and the high-resolution feature is taken into consideration, the embodiments of the present disclosure propose residual projection modules (also referred to as "residual projection blocks") by the inspiration of the ideas of projection. In some embodiments, the residual projection block may include an up-projection module, M residual modules, a local feature fusion module, a down-projection module and a second connection layer, where M is an integer greater than or equal to 1.

In the embodiment of the present disclosure, the up-projection module, the M residual modules, the local feature fusion module, the down-projection module and the second connection layer are connected in sequence, and the second connection layer is further connected to an input of the up-projection module, and outputs of the M residual modules are respectively connected to the local feature fusion module.

Accordingly, for the specific network structure of the residual projection block, the method may further include the following operations.

Third filtering processing is performed on input information of the residual projection block by the up-projection module to obtain first high-resolution feature information.

Different levels of high-resolution features are learned from the first high-resolution feature information by the M residual modules to obtain M pieces of second high-resolution feature information.

Fusion operation is performed on the M pieces of second high-resolution feature information by the local feature fusion module to obtain third high-resolution feature information.

Fourth filtering processing is performed on the third high-resolution feature information by the down-projection module to obtain filtered feature information.

The input information and the filtered feature information are added by the second connection layer to obtain output information of the residual projection block.

Further, in one specific example, the up-projection module may include a transposed convolution layer. Accordingly, the operation of performing the third filtering processing on the input information of the residual projection block by the up-projection module to obtain the first high-resolution feature information may include the following operation.

The third filtering processing is performed on the input information of the residual projection block by the transposed convolution layer to obtain the first high-resolution feature information.

It is to be noted that a resolution of the first high-resolution feature information obtained after the third filtering processing is higher than a resolution of the input information of the residual projection block.

It is also to be noted that the third filtering processing may include up-sampling. That is to say, the up-sampling is performed on the input information of the residual projection block by the transposed convolution layer to obtain the first high-resolution feature information.

Further, in a specific example, the local feature fusion module may include a feature fusion layer and a third convolution layer. The operation of performing the fusion operation on the M pieces of second high-resolution feature information by the local feature fusion module to obtain the third high-resolution feature information includes the following operations.

The fusion operation is performed on the M pieces of second high-resolution feature information by the feature fusion layer to obtain fusion feature information.

Convolution operation is performed on the fusion feature information by the third convolution layer to obtain the third high-resolution feature information.

In the embodiment of the present disclosure, the convolution kernel size of the third convolution layer is K×L, the number of convolution kernels of the third convolution layer is an integer power of 2, and K and L are positive integers greater than zero. In a more specific example, the convolution kernel size of the third convolution layer is 1×1, and the number of convolution kernels of the third convolution layer is 64. However, the convolution kernel size and the number of convolution kernels are not limited in the embodiments of the present disclosure.

That is to say, in the embodiment of the present disclosure, the fusion operation is performed on the M pieces of second high-resolution feature information by the feature fusion layer, but in order to give full play to the learning ability of the residual network, 1×1 convolution layer is introduced to perform the fusion operation on the feature information learned by the residual module, which can adaptively control the learned feature information.

Further, in a specific example, the down-projection module may include a fourth convolution layer, and the operation of performing the fourth filtering processing on the third high-resolution feature information by the down-projection module to obtain the filtered feature information includes the following operation.

The fourth filtering processing on the third high-resolution feature information by the fourth convolution layer to obtain the filtered feature information.

It is to be noted that a resolution of the filtered feature information obtained after the fourth filtering processing is lower than a resolution of the third high-resolution feature information. In addition, the resolution of the filtered feature information obtained after the fourth filtering processing is the same as the resolution of the input information of the residual projection block.

It is also to be noted that the fourth filtering processing may include down-sampling. That is to say, the down-sampling is performed on the third high-resolution feature information by the fourth convolution layer to obtain the filtered feature information.

Figure 6:
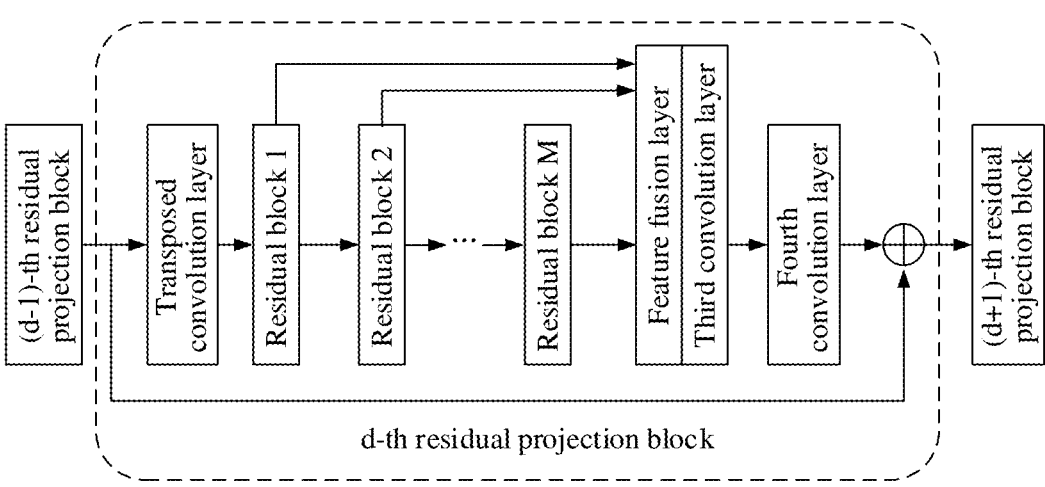
FIG. 6 is a schematic diagram of a network structure of a residual projection block provided by an embodiment of the present disclosure.

Exemplarily, referring to FIG. 6, a schematic diagram of a network structure of a residual projection block provided by an embodiment of the present disclosure is illustrated. The residual projection block may be represented by RPB. As illustrated in FIG. 6, the RPB mainly includes an up-projection module (or up-projection unit), residual modules (or residual blocks), a local feature fusion module (or local feature fusion) and a down-projection module (or down-projection unit). For the d-th residual projection block, it is assumed that it contains M residual blocks, and the specific connection relationship may be seen in FIG. 6.

Firstly, the up-projection unit uses the transposed convolution layer to up-sample the input low-resolution feature, and the mathematical form is illustrated in Equation (9), $$F_{d,0} = (F_{d-1} * p_t) \uparrow_s \qquad (9)$$

Herein, $*$ represents a spatial convolution operation, $F_{d-1}$ represents an input of the d-th residual projection block, $p_t$ represents transposed convolution, $\uparrow_s$ represents up-sampling with a scaling factor s, and $F_{d,0}$ represents an input of the first residual block. Herein, $[F_{d,1}, \ldots, F_{d,M}]$ respectively represent outputs of M residual blocks.

Secondly, in order to give full play to the learning ability of the residual network, the local feature fusion includes a feature fusion layer and a third convolution layer. The $1 \times 1$ third convolution layer is introduced to perform fusion operation on the features learned by the residual blocks. The mathematical form of the feature information learned by adaptive control is illustrated in Equation (10), $$F_{d,LFF} = H_{LFF}^d([F_{d,1}, \ldots, F_{d,M}]) \qquad (10)$$

Thirdly, the down-projection unit uses the convolution operation of the fourth convolution layer to down-sample $F_{d,LFF}$, so as to realize the effect of using the high-resolution feature to guide the low-resolution feature, and finally $F_d$ is obtained by pixel level addition of the down-sampled $F_{d,LFF}$ with $F_{d-1}$. Its mathematical form is illustrated in Equation (11), $$F_d = F_{d-1} + (F_{d,LFF} * q_t) \downarrow_s \qquad (11)$$

Herein, $*$ represents spatial convolution operation, $q_t$ represents the convolution layer, and $\downarrow$ represents down-sampling with a scaling factor s.

That is to say, the embodiment of the present disclose proposes a residual projection block (RPB) through the combination of the transposed convolution and the residual blocks. The basic idea is to use transposed convolution layer to project the low-resolution features to the high-resolution feature space, use residual blocks to learn different levels of high-resolution features, then improve the expression ability of residual blocks by local feature fusion, and finally use convolution layer to project the high-resolution features back to low-resolution feature space. In this way, based on the block, the embodiment of the present disclosure proposes a preset neural network model RPNet with half-precision sub-pixel interpolation, and the trained model is embedded into the coding platform VTM7.0. Therefore, in the video encoding process, according the embodiment of the present disclosure, the motion compensation enhancement by RPNet is performed only on PUs whose sizes are greater than or equal to 64×64. For PUs whose sizes are less than 64×64, the motion compensation enhancement is still performed by the interpolation filter in the related art.

In addition, taking the first matching block as the integer pixel matching block as an example, for motion compensation enhancement, the method in the embodiment of the present disclosure may realize half-precision fractional pixel motion compensation, quarter-precision fractional pixel motion compensation, and even other precision fractional pixel motion compensation, which is not limited in the embodiments of the present disclosure.

In a specific example, when the precision of the sub-pixel sample values is half-precision, the convolution kernel sizes of the transposed convolution layer and the fourth convolution layer are both 6×6, and the step size and the fill value are both set to 2. Alternatively, when the precision of the sub-pixel sample values is a quarter-precision, the convolution kernel sizes of the transposed convolution layer and the fourth convolution layer are both 8×8, and the step size and the fill value are set to 4 and 2, respectively.

In other words, in the model structure, for the RPNet, the number N of residual projection blocks in the RPNet may be set to 10, and the number M of residual blocks in each residual projection block may be set to 3 in a specific example. Except that the number of convolution kernels in the reconstruction network layer is set to 1, the number of convolution kernels in other transposed convolution layers or convolution layers in the network model is set to 64. The sizes of the convolution kernels in the transposed convolution layer in the up-projection unit and in the convolution layer in the down-projection unit are set to 6×6, and the step size and fill are set to 2. In addition, other convolution layers in the network model all use convolution kernels with size 3×3, while the up-sampling unit may use a sub-pixel convolution layer.

In another specific example, the RPNet in the embodiment of the present disclosure may also be used for half-precision sub-pixel sample interpolation for PUs with all sizes. In addition, although all changes may affect the quality of the final video, the RPNet in the embodiment of the present disclosure may also adjust the number of residual projection blocks and adjust the number of residual blocks in the residual projection block. Even the RPNet in the embodiment of the present disclosure may be used for quarter-precision fractional pixel motion compensation. In this case, the sizes of convolution kernels in the transposed convolution layer in the up-projection unit and in the convolution layer in the down-projection unit are set to 8×8, the step size and fill are set to 4 and 2, respectively, and a sub-pixel convolution layer is added in the up-sampling unit.

It may also be understood that the preset neural network model may be obtained by model training. In some embodiments, the method may further include the following operations.

A training data set is determined, and the training data set includes at least one training picture.

The training data set is preprocessed to obtain ground truths of the preset neural network model and at least one input picture group. The input picture group includes at least one input picture.

The neural network model is trained based on the ground truths by using the at least one input picture group to obtain at least one group of candidate model parameters. The ground truths are used for determining a loss value (Loss) of a loss function of the neural network model, and the at least one group of candidate model parameters are obtained when the loss value of the loss function converges to a preset threshold.

It is to be noted that in terms of the data set, in the embodiment of the present disclose, a public data set (such as DIV2K data set) may be selected, which contains 800 training pictures and 100 verification pictures. In the specific operation process, the preprocessing of the DIV2K data set mainly includes two steps: format transforming and coding reconstruction. Firstly, the format transforming is performed on 800 high-resolution pictures in the training set, 100 high-resolution pictures in the test set and low-resolution pictures corresponding to them, and they are transformed from the original PNG format to YUV420 format. Then, luma components are extracted from high-resolution picture data in YUV420 format and stored in PNG format as the ground truths. Complete intra coding is performed on the low-resolution picture data in YUV420 format by VTM7.0, and the quantization parameters (QP) may be set to 22, 27, 32 and 37 respectively. Then, the luma components of the four groups of decoded and reconstructed data are extracted, are stored in PNG format, and are used as the input of the neural network model. Thus, four training data sets may be obtained.

As for the evaluation criterion, in the embodiment of the present disclosure, the Peak Signal-to-Noise Ratio (PSNR) is selected as the evaluation criterion for the picture reconstruction quality.

As for the training of the network, the model is trained based on the Pytorch platform. The low-resolution picture with a size of 48×48 is taken as an input, and the batch is set to 16. In the embodiments of the present disclosure, an average absolute error may be selected as the loss function, adaptive moment estimation is taken as an optimization function, and the momentum and the weight attenuation are set to 0.9 and 0.0001, respectively. The initial learning rate is set to 0.0001 and decreased by a ratio of 0.1 per 100 epochs, and a total of 300 epochs will pass. According to different QPs, four groups of model parameters may be obtained by training with corresponding data sets. The four groups of model parameters correspond to four models, and the four models are represented by RPNet_qp22, RPNet_qp27, RPNet_qp32 and RPNet_qp37, respectively.

Further, after the model training, in some embodiments, the method may further include the following operations.

A quantization parameter of the current block is determined.

A model parameter corresponding to the quantization parameter is determined from the at least one group of candidate model parameters according to the quantization parameter.

The preset neural network model is determined according to the model parameter.

Herein, when at least one group is multiple groups, the at least one input picture group corresponds to different quantization parameters, and the multiple groups of candidate model parameters correspond to different quantization parameters.

That is, after the model training, trained model parameters corresponding to a quantization parameter of a current block may be determined according to the quantization parameter, and then the preset neural network model used in the embodiment of the present disclosure may be determined.

Further, in some embodiments, the method may further include encoding the model parameter and signalling encoded bits.

It is to be noted that, on one hand, if the encoder and decoder use the same preset neural network model with the fixed parameter, then the parameter has been fixed, so there is no need to transmit the model parameter. On the other hand, if access information of a common training data set, such as a Uniform Resource Locator (URL), is transmitted in the bitstream, the decoder is trained in the same way as the encoder. In another aspect, for the encoder, the encoded video sequence may be used for learning.

It is also to be noted that if the encoder signals the model parameter, the decoder may no longer need model training, and after the model parameter is obtained by parsing the bitstream, the preset neural network model used in the embodiment of the present disclosure may be determined.

Thus, after the preset neural network model is determined, the motion compensation enhancement is performed on the first matching block by using the preset neural network model to obtain the at least one second matching block.

In operation S403, motion information of the current block is determined according to the at least one second matching block.

It is to be noted that if the first matching block is an integer pixel matching block, after the at least one second matching block is obtained, in the embodiment of the present disclosure, sub-pixel motion estimation is needed to be performed. In some embodiments, the method may further include the following operation.

The sub-pixel motion estimation is performed on the current block according to the at least one second matching block to determine a sub-pixel matching block of the current block.

Specifically, the sub-pixel motion estimation is performed on the current block according to the at least one second matching block to determine a target matching block at the sub-pixel position of the current block, and the target matching block at the sub-pixel position is determined as the sub-pixel matching block. The target matching block at the sub-pixel position (which may be referred to as "sub-pixel matching block") is the matching block with a minimum rate-distortion cost when motion estimation is performed on the current block at sub-pixel positions.

Herein, in the process of sub-pixel motion estimation, for multiple second matching blocks, the rate distortion cost corresponding to a matching block at each sub-pixel position is needed to be calculated, and then the matching block at the sub-pixel position with the minimum rate distortion cost, that is, the best matching block or the target matching block described in the embodiment of the present disclosure, is selected. That is, the target matching block at the sub-pixel position (or simply referred to as "sub-pixel matching block") is a matching block corresponding to the minimum rate distortion cost selected from the multiple second matching blocks.

In some embodiments, the operation of determining the motion information for the current block according to the at least one second matching block may include the following operations.

Pre-encoding processing is performed on the current block by using the first matching block to determine a first rate distortion cost.

Pre-coding processing is performed on the current block by using the sub-pixel matching block to determine a second rate distortion cost.

If the first rate distortion cost is greater than the second rate distortion cost, a motion compensation enhancement processing mode is used for the current block, and the motion information is determined as first motion information. The first motion information is used for pointing to a sub-pixel position.

If the first rate distortion cost is less than or equal to the second rate distortion cost, it is determined that the motion compensation enhancement processing mode is not used for the current block, and the motion information is determined as second motion information. The second motion information is used for pointing to an integer pixel position.

It is to be noted that in the embodiment of the present disclosure, to use the motion compensation enhancement processing mode or not to use the motion compensation enhancement processing mode (or use the integer pixel motion compensation mode) for the current block is determined according to the calculated rate distortion cost. That is to say, the encoder finally selects the mode with the minimum rate distortion cost for prediction encoding.

It is also to be noted that if it is determined that the motion compensation enhancement processing mode is used for the current block, the motion information is the first motion information, that is, it is used for pointing to the sub-pixel position (i.e., the "sub-pixel precision position"). In this case, the decoder also needs to perform motion compensation enhancement to obtain the second matching block through interpolation. Otherwise, if it is determined that the motion compensation enhancement processing mode is not used for the current block, the motion information is the second motion information, that is, it is used for pointing to the integer-pixel position (i.e., the "integer-pixel precision position"), and the decoder does not need to perform motion compensation enhancement.

Further, in some embodiments, the method may further include the following operations.

If the first rate distortion cost is greater than the second rate distortion cost, a value of the first syntax element identification information is determined to be a first value.

If the first rate distortion cost is less than or equal to the second rate distortion cost, the value of the first syntax element identification information is determined to be a second value.

In embodiments of the present disclosure, the first value is different from the second value, and the first value and the second value may be in the form of a parameter or a number. Normally, the first syntax element identification information is a parameter written in a profile, but the first syntax element identification information may also be a flag, which is not limited here.

That is, in the embodiment of the present disclosure, the first syntax element identification information may also be set, and the first syntax element identification information is for indicating whether to use the motion compensation enhancement processing mode for the current block. Thus, in the decoder, whether to use the motion compensation enhancement processing mode for the current block may be determined according to the value of the first syntax element identification information.

It is also to be noted that if the first syntax element identification information is a flag, then in a specific example, the first value may be set to 1 and the second value may be set to 0. In another specific example, the first value may also be set to true and the second value may also be set to false. Even in yet another specific example, the first value may be set to 0 and the second value may be set to 1. Alternatively, the first value may be set to false and the second value may be set to true. The first value and the second value are not limited in the embodiment of the present disclosure.

In addition, in the embodiment of the present disclosure, the second syntax element identification information may also be set, and the second syntax element identification information indicates whether to use the motion compensation enhancement mode in the embodiment of the present disclosure for the current block. In some embodiments, the method may further include the following operations. If the second syntax element identification information indicates that the motion compensation enhancement mode in the embodiment of the present disclosure is used for the current block, that is, the value of the second syntax element identification information is the first value, the process illustrated in FIG. 4 is performed. If the second syntax element identification information indicates that the motion compensation enhancement mode in the embodiment of the present disclosure is not used for the current block, that is, the value of the second syntax element identification information is the second value, the motion compensation enhancement mode in the related technology, such as a DCTIF-based fractional pixel motion compensation mode, is performed.

Further, in some embodiments, the method may further include the following operation. The value of the first syntax element identification information is encoded and the encoded bits are signalled. Thus, after the encoder signals the value of the first syntax element identification information, the decoder may directly determine whether to use the motion compensation enhancement processing mode for the current block by parsing the bitstream, so as to facilitate the decoder to perform subsequent operations.

In operation S404, the current block is encoded according to the motion information.

It is to be noted that the motion information may at least include reference picture information and the motion vector. In this way, the prediction block may be determined from the reference picture according to the motion information of the current block.

In one possible embodiment, if the motion compensation enhancement process mode is used for the current block, the operation of encoding the current block according to the motion information may include the following operations.

A first prediction block of the current block is determined according to the first motion information and the sub-pixel matching block.

A residual block of the current block is determined according to the current block and the first prediction block.

The residual block is encoded and the encoded bits are signalled.

In a specific example, the operation of determining the residual block of the current block according to the current block and the first prediction block may include performing subtraction between the current block and the first prediction block to determine the residual block of the current block.

In another possible embodiment, if the motion compensation enhancement processing mode is not used for the current block, the operation of encoding the current block according to the motion information may include the operations.

A second prediction block of the current block is determined according to the second motion information and the first matching block.

A residual block of the current block is determined according to the current block and the second prediction block.

The residual block is encoded and encoded bits are signalled.

It is to be noted that in the embodiment of the present disclosure, if the motion compensation enhancement processing mode is not used for the current block, it means that the integer pixel motion compensation mode is used for the current block.

It is also to be noted that, in a specific example, the operation of determining the residual block of the current block according to the current block and the second prediction block may include: performing subtraction between the current block and the second prediction block to determine the residual block of the current block.

Further, in some embodiments, the method may further include encoding the motion information and signaling the encoded bits. Thus, after the encoder signals the motion information, the decoder is enabled to determine the prediction block (first prediction block or second prediction block) of the current block according to the motion information after determining the motion information by parsing the bitstream, so as to facilitate the decoder to perform subsequent operations.

In short, when the relationship between the low-resolution feature and the high-resolution feature is taken into consideration, upon the inspiration of projection ideas, residual projection blocks are proposed in the embodiments of the present disclosure in combination with transposed convolution and residual networks. Then, based on the residual projection blocks, the embodiments of the present disclosure propose a half-precision sub-pixel interpolation network RPNet, and it is applied to VTM7.0.

In this way, the technical schemes proposed by the embodiments of the present disclosure are implemented on VTM7.0, and then the video sequence is encoded under the P condition with low delay. As illustrated in Table 1, encoding results obtained by VTM7.0 applying the RPNet-based fractional pixel motion compensation method are illustrated. Compared with VTM7.0, under the premise of the same decoding quality, the bit rate (BD-Rate) can be reduced by 0.18% on average by the method proposed in this technical scheme. Especially for SlideShow video sequences, the BD-Rate can be reduced by 0.57% by this method, which further illustrates the effectiveness of the half-precision fractional pixel motion compensation method based on RPNet.

TABLE 1

| Video sequences | Resolution | BD-Rate[%] |
|---|---|---|
| BQMall | 832 × 480 | −0.04 |
| RaceHorses | 832 × 480 | −0.12 |
| BasketballDrillText | 832 × 480 | −0.16 |
| ChinaSpeed | 1024 × 768 | −0.14 |
| SlideShow | 1280 × 720 | −0.57 |
| KristenAndSara | 1280 × 720 | −0.06 |
| Average | | −0.18 |

The embodiments of the present disclosure provide an encoding method, which is applied to an encoder. A first matching block of a current block is determined, motion compensation enhancement is performed on the first matching block to obtain at least one second matching block, motion information of the current block is determined according to the at least one second matching block, and the current block is encoded according to the motion information. In this way, the motion compensation enhancement is performed by using the preset neural network model, not only the computational complexity can be reduced, but also the bit rate can be saved on the premise of ensuring the same decoding quality, thus improving the encoding and decoding efficiency.

In another embodiment of the present disclosure, the embodiment of the present disclosure provides a bitstream. The bitstream is generated by bit encoding according to information to be encoded, the information to be encoded at least includes motion information of a current block, a residual block of the current block and a value of first syntax element identification information, and the first syntax element identification information is for indicating whether to use motion compensation enhancement processing mode for the current block.

In embodiments of the present disclosure, the bitstream may be transmitted from the encoder to the decoder to facilitate the decoder to perform subsequent operations.

Figure 7:
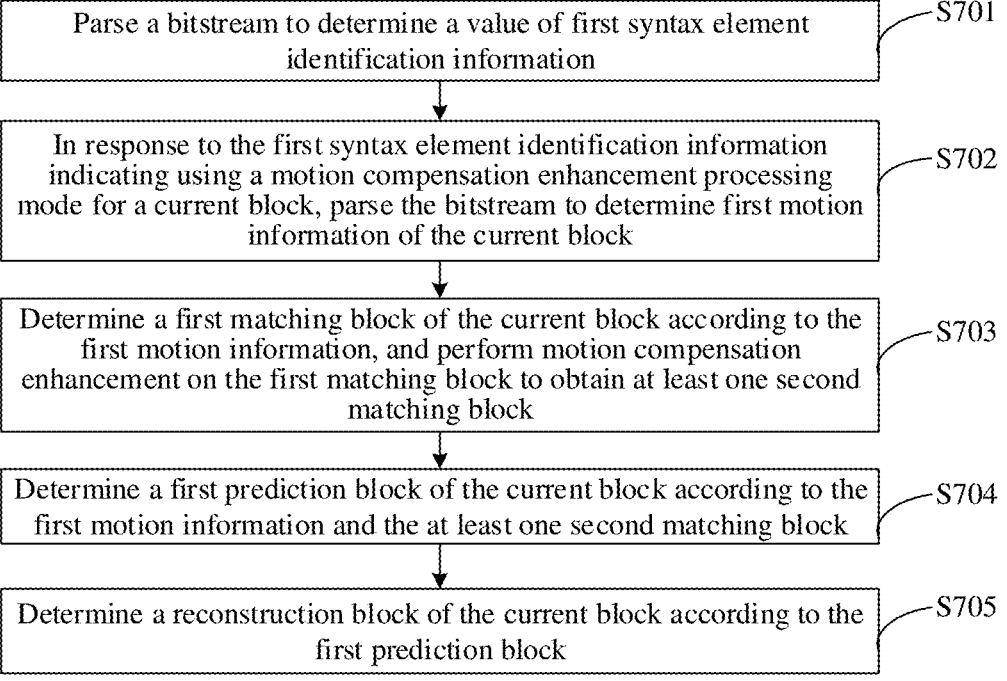
FIG. 7 is a schematic flowchart of a decoding method provided by an embodiment of the present disclosure.

In yet another embodiment of the present disclosure, referring to FIG. 7, a schematic flowchart of a decoding method provided by an embodiment of the present disclosure is illustrated. As illustrated in FIG. 7, the method may include the following operations.

In operation S701, a bitstream is parsed to determine a value of first syntax element identification information.

It is to be noted that for a video picture, the video picture may be partitioned into multiple picture blocks, and each picture block to be decoded may be called a coding block. The current block here specifically refers to the coding block currently to be subjected to inter prediction. The current block may be a CTU, even a CU, a PU, etc., which is not limited in the embodiments of the present disclosure.

It should also be explained that the decoding method in the embodiment of the present disclosure is mainly applied to the motion compensation of the inter prediction. The motion compensation is to predict and compensate the current local picture by using the local picture in the decoded and reconstructed reference picture, which may reduce the redundant information of the moving picture.

In some embodiments, the operation of parsing the bitstream to determine the value of the first syntax element identification information may include the following operations.

If the value of the first syntax element identification information is first value, it is determined that the motion compensation enhancement processing mode is used for the current block.

If the value of the first syntax element identification information is second value, it is determined that the motion compensation enhancement processing mode is not used for the current block.

It is to be noted that the first syntax element identification information is for indicating whether to use the motion compensation enhancement processing mode for the current block. In addition, the first value is different from the second value, and the first value and the second value may be in the form of a parameter or a number. Normally, the first syntax element identification information is a parameter written in a profile, but the first syntax element identification information may also be a flag, which is not limited here.

It is also to be noted that if the first syntax element identification information is a flag, then in a specific example, the first value may be set to 1 and the second value may be set to 0. In another specific example, the first value may also be set to true and the second value may also be set to false. Even in yet another specific example, the first value may be set to 0 and the second value may be set to 1. Alternatively, the first value may be set to false and the second value may be set to true. The first value and the second value are not limited in the embodiment of the present disclosure.

Taking the first value being 1 and the second value being 0 as an example, in the embodiment of the present disclosure, if the value of the first syntax element identification information is 1, it may be determined that the motion compensation enhancement processing mode is used for the current block, then the motion information obtained by decoding is the first motion information, that is, it is used for pointing to the sub-pixel position. In this case, the decoder also needs to perform motion compensation enhancement to obtain the second matching block through interpolation. Otherwise, if the value of the first syntax element identification information is 0, it may be determined that the motion compensation enhancement processing mode is not used for the current block, then the motion information obtained by decoding is the second motion information, that is, it is used for pointing to the integer-pixel position, and the decoder does not need to perform motion compensation enhancement.

In operation S702, if the first syntax element identification information indicates using a motion compensation enhancement processing mode for a current block, the bitstream is parsed to determine the first motion information of the current block.

In operation S703, a first matching block of the current block is determined according to the first motion information, and motion compensation enhancement is performed on the first matching block to obtain at least one second matching block.

In embodiments of the present disclosure, the motion information may include reference picture information and Motion Vector (MV) information. Taking the VVC as an example, whether to use fractional pixel motion compensation is determined by an MV precision determined by parsing bitstream. For example, whether an MV is integer pixel precision or sub-pixel precision is identified. If it is sub-pixel precision, for example, ¼ pixel, and the lower two bits of the MV component are all 0, it may indicate that the MV points to the integer pixel precision position. On the contrary, it points to the sub-pixel precision position.

It is to be noted that the first matching block here may point to an integer pixel precision position, or a sub-pixel precision position that is pointed to by using the sub-pixel interpolation filtering in the related technology, which is not limited in the embodiments of the present disclosure.

It is also to be noted that if the first matching block points to the integer pixel precision position, when the first syntax element identification information indicates that the motion compensation enhancement processing mode is used for the current block, the decoder needs to perform fractional pixel motion compensation to obtain the second matching block through interpolation. Herein, since the decoded reference pictures in the decoder are all at integer pixel positions, the sub-pixel positions in the integer pixel positions need to be obtained by interpolation, and in the embodiment of the present disclosure, it is implemented by using a fractional pixel motion compensation mode based on a preset neural network model.

In some embodiments, the operation of performing the motion-compensation enhancement on the first matching block may further include: the motion compensation enhancement is performed on the first matching block by using a preset neural network model.

Accordingly, the operation of performing the motion compensation enhancement on the first matching block to obtain the at least one second matching block may include the following operations.

Super-resolution and quality enhancement processing is performed on the first matching block by using the preset neural network model to obtain a processed block.

First filtering processing is performed on the processed block to obtain the at least one second matching block.

It is to be noted that a resolution of the processed block is higher than a resolution of the current block. Or, in other words, the processed block obtained after the super-resolution and quality enhancement processing has performances of high quality and high resolution.

It is also to be noted that a resolution of the first matching block is the same as the resolution of the current block, and a resolution of the second matching block obtained after the first filtering processing is the same as the resolution of the current block.

Further, in some embodiments, the first filtering processing may include down-sampling. That is, after the processed block is obtained, down-sampling is performed on the processed block to obtain the at least one second matching block.

In a specific example, if the first matching block is an integer pixel matching block, the operation of performing the motion compensation enhancement on the first matching block by using the preset neural network model to obtain the at least one second matching block may include the following operation.

Fractional pixel motion compensation is performed on the first matching block by using the preset neural network model to obtain the at least one second matching block.

Herein, if the first matching block is an integer pixel matching block, then in one possible embodiment, the precision of the second matching block is half-precision, and the number of the second matching blocks is four. In another possible embodiment, the precision of the second matching block is quarter-precision, and the number of the second matching blocks is 16. However, the precision and the number are not limited in the embodiments of the present disclosure.

It is to be understood that the preset neural network model may be a convolution neural network model. In the embodiment, end-to-end super-resolution and quality enhancement on the first matching block is implemented by using the convolution neural network model, and then down-sampling is performed on the output high-resolution picture so that four half-precision sub-pixel samples (i.e., "the second matching blocks") are generated.

Further, in some embodiments, the preset neural network model may include a feature extraction module, a residual projection module group, a sampling module and a reconstruction module. The feature extraction module, the residual projection module group, the sampling module and the reconstruction module are connected in sequence.

Accordingly, based on the specific structure of the preset neural network model, the operation of performing the super-resolution and quality enhancement processing on the first matching block to obtain the processed block may include the following operations.

Shallow feature extraction is performed on the first matching block by the feature extraction module to obtain first feature information.

Residual feature learning is performed on the first feature information by the residual projection module group to obtain second feature information.

Second filtering processing is performed on the second feature information by the sampling module to obtain third feature information.

Super-resolution reconstruction is performed on the third feature information by the reconstruction module to obtain the processed block.

Herein, the feature extraction module may also be referred to as "shallow feature extraction module". In a specific example, the feature extraction module may be a first convolution layer. Accordingly, the operation of performing the shallow feature extraction on the first matching block by the feature extraction module to obtain the first feature information may include: convolution operation is performed on the first matching block by the first convolution layer to obtain the first feature information. It is to be noted that the shallow features here mainly refer to simple features at low levels (such as edge features, etc.).

In some embodiments, the convolution kernel size of the first convolution layer is K×L, the number of convolution kernels of the first convolution layer is an integer power of 2, and K and L are positive integers greater than zero. In a more specific example, the convolution kernel size of the first convolution layer may be 3×3, and the number of convolution kernels of the first convolution layer is 64. However, the convolution kernel size and the number of convolution kernels are not limited in the embodiments of the present disclosure.

Further, in a specific example, the residual projection module group may include N residual projection blocks, a second convolution layer and a first connection layer. N is an integer greater than or equal to 1.

In an embodiment of the present disclosure, the N residual projection blocks, the second convolution layer and the first connection layer are connected in sequence, and the first connection layer is further connected to an input of a first one of the N residual projection blocks.

Accordingly, the operation of performing the residual feature learning on the first feature information by the residual projection module group to obtain the second feature information includes the following operations.

The residual feature learning is performed on the first feature information by the N residual projection blocks to obtain first intermediate feature information.

Convolution operation is performed on the first intermediate feature information by the second convolution layer to obtain the second intermediate feature information.

The first feature information and the second intermediate feature information are added by the first connection layer to obtain the second feature information.

In some embodiments, the convolution kernel size of the second convolution layer is K×L, the number of convolution kernels of the second convolution layer is an integer power of 2, and K and L are positive integers greater than zero. In a more specific example, the convolution kernel size of the second convolution layer is 3×3, and the number of convolution kernels of the second convolution layer is 64. However, the convolution kernel size and the number of convolution kernels are not limited in the embodiments of the present disclosure.

Further, in terms of the mode of stacking the residual projection blocks, the N residual projection blocks are in a cascaded structure, an input of the cascaded structure is the first feature information, and an output of the cascaded structure is the second intermediate feature information. In some embodiments, the operation of performing the residual feature learning on the first feature information by the N residual projection blocks to obtain the first intermediate feature information may include the following operations.

If N is equal to 1, the first feature information is input into the first residual projection block to obtain output information of the first residual projection block, and the output information of the first residual projection block is determined as the first intermediate feature information.

If N is greater than 1, after the output information of the first residual projection block is obtained, output information of a d-th residual projection block is input into a (d+1)-th residual projection block to obtain output information of the (d+1)-th residual projection block, d is incremented by 1 until output information of an N-th residual projection block is obtained, and the output information of the N-th residual projection block is determined as the first intermediate feature information, where d is an integer greater than or equal to 1 and less than N.

Herein, if N is equal to 1, that is, the residual projection module group includes only one residual projection block, the output information of this residual projection block is the first intermediate feature information. If N is greater than 1, that is, the residual projection module group includes more than two residual projection blocks, residual learning is performed in a stacking way, that is, the output of the preceding residual projection block is the input of its next residual projection block, until the output information of the last residual projection block is obtained, and then the output information of the last residual projection block is the first intermediate feature information.

It may also be understood that when the relationship between the low-resolution feature and the high-resolution feature is taken into consideration, the embodiments of the present disclosure propose residual projection modules (also referred to as "residual projection blocks") by the inspiration of the ideas of projection. In some embodiments, the residual projection block may include an up-projection module, M residual modules, a local feature fusion module, a down-projection module and a second connection layer, where M is an integer greater than or equal to 1.

In the embodiment of the present disclosure, the up-projection module, the M residual modules, the local feature fusion module, the down-projection module and the second connection layer are connected in sequence, and the second connection layer is further connected to an input of the up-projection module, and outputs of the M residual modules are respectively connected to the local feature fusion module.

Accordingly, for the specific network structure of the residual projection block, the method may further include the following operations.

Third filtering processing is performed on input information of the residual projection block by the up-projection module to obtain first high-resolution feature information.

Different levels of high-resolution features are learned from the first high-resolution feature information by the M residual modules to obtain M pieces of second high-resolution feature information.

Fusion operation is performed on the M pieces of second high-resolution feature information by the local feature fusion module to obtain third high-resolution feature information.

Fourth filtering processing is performed on the third high-resolution feature information by the down-projection module to obtain filtered feature information.

The input information and the filtered feature information are added by the second connection layer to obtain output information of the residual projection block.

Further, in one specific example, the up-projection module may include a transposed convolution layer. Accordingly, the operation of performing the third filtering processing on the input information of the residual projection block by the up-projection module to obtain the first high-resolution feature information may include the following operation.

The third filtering processing is performed on the input information of the residual projection block by the transposed convolution layer to obtain the first high-resolution feature information.

It is to be noted that a resolution of the first high-resolution feature information obtained after the third filtering processing is higher than a resolution of the input information of the residual projection block.

It is also to be noted that the third filtering processing may include up-sampling. That is to say, the up-sampling is performed on the input information of the residual projection block by the transposed convolution layer to obtain the first high-resolution feature information.

Further, in a specific example, the local feature fusion module may include a feature fusion layer and a third convolution layer. The operation of performing the fusion operation on the M pieces of second high-resolution feature information by the local feature fusion module to obtain the third high-resolution feature information includes the following operations.

The fusion operation is performed on the M pieces of second high-resolution feature information by the feature fusion layer to obtain fusion feature information.

Convolution operation is performed on the fusion feature information by the third convolution layer to obtain the third high-resolution feature information.

In the embodiment of the present disclosure, the convolution kernel size of the third convolution layer is K×L, the number of convolution kernels of the third convolution layer is an integer power of 2, and K and L are positive integers greater than zero. In a more specific example, the convolution kernel size of the third convolution layer is 1×1, and the number of convolution kernels of the third convolution layer is 64. However, the convolution kernel size and the number of convolution kernels are not limited in the embodiments of the present disclosure.

That is to say, in the embodiment of the present disclosure, the fusion operation is performed on the M pieces of second high-resolution feature information by the feature fusion layer, but in order to give full play to the learning ability of the residual network, 1×1 convolution layer is introduced to perform the fusion operation on the feature information learned by the residual module, which can adaptively control the learned feature information.

Further, in a specific example, the down-projection module may include a fourth convolution layer, and the operation of performing the fourth filtering processing on the third high-resolution feature information by the down-projection module to obtain the filtered feature information includes the following operation.

The fourth filtering processing on the third high-resolution feature information by the fourth convolution layer to obtain the filtered feature information.

It is to be noted that a resolution of the filtered feature information obtained after the fourth filtering processing is lower than a resolution of the third high-resolution feature information. In addition, the resolution of the filtered feature information obtained after the fourth filtering processing is the same as the resolution of the input information of the residual projection block.

It is also to be noted that the fourth filtering processing may include down-sampling. That is to say, the down-sampling is performed on the third high-resolution feature information by the fourth convolution layer to obtain the filtered feature information.

In addition, for the sampling module in the preset neural network module, in one specific example, the sampling module may include a sub-pixel convolution layer. Accordingly, the operation of performing the second filtering processing on the second feature information by the sampling module to obtain the third feature information may include the following operation.

The second filtering processing is performed on the second feature information by the sub-pixel convolution layer to obtain the third feature information.

It is to be noted that a resolution of the third feature information obtained after the second filtering processing is higher than a resolution of the second feature information.

It is also to be noted that the second filtering processing may include up-sampling. That is to say, the sampling module is mainly used for up-sampling the second feature information, so the sampling module may also be referred to as the "up-sampling module".

It is also to be noted that the sampling module may use a sub-pixel convolution layer, or a sub-pixel convolution layer may be added in the sampling module. Herein, the sub-pixel convolution layer may also be a PixShuffle module (or referred to as Pixelshuffle module), which realizes the function of transforming a H×W low-resolution input picture into a rH×rW high-resolution input picture by sub-pixel operation. However, the implementation process is not to generate this high-resolution picture directly by interpolation, but to firstly obtain a feature map having $r^2$ channels by convolution (the size of the feature map is consistent with the size of the input low-resolution picture), and then to obtain this high-resolution picture by the periodic shuffling method, where r may be the magnification of the picture. Specifically, with respect to the feature map, the number of channels is $r^2$, the $r^2$ channels of each pixel are rearranged into a region of r×r, which corresponds to a sub-block with a size of r×r in the high-resolution picture, so that the feature picture with a size of $r^2$×H×W is rearranged into a high-resolution picture with a size of 1×rH×rW.

Further, for the reconstruction module in the preset neural network module, in one specific example, the reconstruction module may include a fifth convolution layer. Accordingly, the operation of performing the super-resolution reconstruction on the third feature information by the reconstruction module to obtain the processed block may include the following operation Convolution operation is performed on the third feature information by the fifth convolution layer to obtain the processed block.

In the embodiment of the present disclosure, the convolution kernel size of the fifth convolution layer is K×L, the number of convolution kernels of the fifth convolution layer is an integer power of 2, and K and L are positive integers greater than zero. In a more specific example, the convolution kernel size of the fifth convolution layer is 3×3, and the number of convolution kernels of the fifth convolution layer is 1, which is not limited in the embodiments of the present disclosure.

Exemplarily, FIG. 5 illustrates a network structure example of a preset neural network model provided by an embodiment of the present disclosure, and FIG. 6 illustrates a network structure example of a residual projection block provided by an embodiment of the present disclosure. That is to say, the embodiment of the present disclose proposes a residual projection block (RPB) though the combination of the transposed convolution and the residual blocks. The basic idea is to use transposed convolution layer to project the low-resolution features to the high-resolution feature space, use residual blocks to learn different levels of high-resolution features, then improve the expression ability of residual blocks by local feature fusion, and finally use convolution layer to project the high-resolution features back to low-resolution feature space. In this way, based on the block, the embodiment of the present disclosure proposes a preset neural network model RPNet with half-precision sub-pixel interpolation, and the trained model is embedded into the coding platform VTM7.0. Therefore, in the video encoding process, according to the embodiment of the present disclosure, the motion compensation enhancement by RPNet is performed only on PUs whose sizes are greater than or equal to 64×64. For PUs whose sizes are less than 64×64, the motion compensation enhancement is still performed by the interpolation filter in the related art.

In addition, taking the first matching block as the integer pixel matching block as an example, for motion compensation enhancement, the method in the embodiment of the present disclosure may realize half-precision fractional pixel motion compensation, quarter-precision fractional pixel motion compensation, and even other precision fractional pixel motion compensation, which is not limited in the embodiments of the present disclosure.

In a specific example, when the precision of the sub-pixel sample values is half-precision, the convolution kernel sizes of the transposed convolution layer and the fourth convolution layer are both 6×6, and the step size and the fill value are both set to 2. Alternatively, when the precision of the sub-pixel sample values is a quarter-precision, the convolution kernel sizes of the transposed convolution layer and the fourth convolution layer are both 8×8, and the step size and the fill value are set to 4 and 2, respectively.

In other words, in the model structure, for the RPNet, the number N of residual projection blocks in the RPNet may be set to 10, and the number M of residual blocks in each residual projection block may be set to 3 in a specific example. Except that the number of convolution kernels in the reconstruction network layer is set to 1, the number of convolution kernels in other transposed convolution layers or convolution layers in the network model is set to 64. The sizes of the convolution kernels in the transposed convolution layer in the up-projection unit and in the convolution layer in the down-projection unit are set to 6×6, and the step size and fill are set to 2. In addition, other convolution layers in the network model all use convolution kernels with size 3×3, while the up-sampling unit may use a sub-pixel convolution layer.

In another specific example, the RPNet in the embodiment of the present disclosure may also be used for half-precision sub-pixel sample interpolation for PUs with all sizes. In addition, although all changes may affect the quality of the final video, the RPNet in the embodiment of the present disclosure may also adjust the number of residual projection blocks and adjust the number of residual blocks in the residual projection block. Even the RPNet in the embodiment of the present disclosure may be used for quarter-precision fractional pixel motion compensation. In this case, the sizes of convolution kernels in the transposed convolution layer in the up-projection unit and in the convolution layer in the down-projection unit are set to 8×8, the step size and fill are set to 4 and 2, respectively, and a sub-pixel convolution layer is added in the up-sampling unit.

Further, the preset neural network model may be obtained by model training. In some embodiments, the method may further include the following operations.

A training data set is determined, and the training data set includes at least one training picture and at least one verification picture.

The training data set is preprocessed to obtain ground truths of the preset neural network model and at least one input picture group. The input picture group includes at least one input picture.

The neural network model is trained based on the ground truths by using the at least one input picture group to obtain at least one group of candidate model parameters. The ground truths are used for determining a loss value (Loss) of a loss function of the neural network model, and the at least one group of candidate model parameters are obtained when the loss value of the loss function converges to a preset threshold.

It is to be noted that in terms of the data set, in the embodiment of the present disclose, a public data set (such as DIV2K data set) may be selected, which contains 800 training pictures and 100 verification pictures. In the specific operation process, the preprocessing of the DIV2K data set mainly includes two steps: format transforming and coding reconstruction. Firstly, the format transforming is performed on 800 high-resolution pictures in the training set, 100 high-resolution pictures in the test set and low-resolution pictures corresponding to them, and they are transformed from the original PNG format to YUV420 format. Then, luma components are extracted from high-resolution picture data in YUV420 format and stored in PNG format as the ground truths. Complete intra coding is performed on the low-resolution picture data in YUV420 format by VTM7.0, and the quantization parameters (QP) may be set to 22, 27, 32 and 37 respectively. Then, the luma components of the four groups of decoded and reconstructed data are extracted, are stored in PNG format, and are used as the input of the neural network model. Thus, four training data sets may be obtained.

As for the evaluation criterion, in the embodiment of the present disclosure, the Peak Signal-to-Noise Ratio (PSNR) is selected as the evaluation criterion for the picture reconstruction quality.

As for the training of the network, the model is trained based on the Pytorch platform. The low-resolution picture with a size of 48×48 is taken as an input, and the batch is set to 16. In the embodiments of the present disclosure, an average absolute error may be selected as the loss function, adaptive moment estimation is taken as an optimization function, and the momentum and the weight attenuation are set to 0.9 and 0.0001, respectively. The initial learning rate is set to 0.0001 and decreased by a ratio of 0.1 per 100 epochs, and a total of 300 epochs will pass. According to different QPs, four groups of model parameters may be obtained by training with corresponding data sets. The four groups of model parameters correspond to four models, and the four models are represented by RPNet_qp22, RPNet_qp27, RPNet_qp32 and RPNet_qp37, respectively.

Furthermore, the determination of the preset neural network model may be realized in the following two methods.

In one possible embodiment, after the model training, the method may further include the following operations A quantization parameter of the current block is determined.

A model parameter corresponding to the quantization parameter is determined from the at least one group of candidate model parameters according to the quantization parameter.

The preset neural network model is determined according to the model parameter.

Herein, when at least one group is multiple groups, the at least one input picture group corresponds to different quantization parameters, and the multiple groups of candidate model parameters correspond to different quantization parameters.

In another possible embodiment, the method may further include the following operations.

The bitstream is parsed to obtain a model parameter.

The preset neural network model is determined according to the model parameter.

It is to be noted that after the model training, the decoder may determine the trained model parameter corresponding to the quantization parameter of the current block according to the quantization parameter, and then determine the preset neural network model used in the embodiment of the present disclosure. Alternatively, the decoder may obtain the model parameter by parsing the bitstream, and then determine the preset neural network model used in the embodiment of the present disclosure according to the model parameter. Embodiments of the present disclosure are not specifically limited thereto.

It is to be noted that, on one hand, if the encoder and decoder use the same preset neural network model with the fixed parameter, then the parameter has been fixed, so there is no need to transmit the model parameter. On the other hand, if access information of a common training data set, such as a Uniform Resource Locator (URL), is transmitted in the bitstream, the decoder is trained in the same way as the encoder. In another aspect, for the encoder, the encoded video sequence may be used for learning.

Thus, if the first syntax element identification information indicates using the motion compensation enhancement processing mode for the current block, after determining the first motion information and the preset neural network model, the motion compensation enhancement is performed on the first matching block by using the preset neural network model to obtain the at least one second matching block.

In operation S704, a first prediction block of the current block is determined according to the first motion information and the at least one second matching block.

In operation S705, a reconstruction block of the current block is determined according to the first prediction block.

It is to be noted that the decoder further needs to perform decoding to obtain the residual block of the current block. In some embodiments, the method may further include: the bitstream is parsed to obtain a residual block of the current block. Thus, the operation of determining the reconstruction block of the current block according to the first prediction block may include determining the reconstruction block of the current block according to the residual block and the first prediction block.

In a specific example, the operation of determining the reconstruction block of the current block according to the residual block and the first prediction block may include performing Add operation on the residual block and the first prediction block to determine the reconstruction block of the current block.

In addition, in the embodiment of the present disclosure, the first syntax element identification information may also indicate not using the motion compensation enhancement processing mode for the current block, that is, the integer pixel motion compensation mode is used for the current block. In this case, in some embodiments, the method may further include the following operations.

If the first syntax element identification information indicates not using the motion compensation enhancement processing mode for the current block, the bitstream is parsed to obtain second motion information of the current block. The second motion information is used for pointing to an integer pixel position.

A second prediction block of the current block is determined according to the second motion information of the current block.

The reconstruction block of the current block is determined according to the second prediction block.

It is to be noted that if integer pixel motion compensation is used for the current block, motion compensation enhancement is no longer needed in this case. The second prediction block of the current block may be determined according to the second motion information obtained by decoding.

It is also to be noted that in the process of determining the reconstruction block of the current block, the decoder still needs to perform decoding to obtain the residual block of the current block. Specifically, in some embodiments, the method may also include parsing the bitstream to obtain the residual block of the current block. Thus, the operation of determining the reconstruction block of the current block according to the second prediction block may include determining the reconstruction block of the current block according to the residual block and the second prediction block.

In a specific example, the operation of determining the reconstruction block of the current block according to the residual block and the second prediction block may include performing Add operation on the residual block and the second prediction block to determine the reconstruction block of the current block.

In short, in the decoder, if it is obtained by decoding that motion compensation enhancement processing mode is used for the current block, when the relationship between low-resolution feature and high-resolution feature is taken into consideration, upon the inspiration of projection ideas, residual projection blocks are proposed in the embodiments of the present disclosure in combination with transposed convolution and residual networks. Then, based on the residual projection blocks, the embodiments of the present disclosure propose a half-precision sub-pixel interpolation network RPNet, and it is applied to VTM7.0.

The embodiments of the present disclosure provide a decoding method, which is applied to a decoder. A bitstream is parsed to determine a value of first syntax element identification information. If the first syntax element identification information indicates using a motion compensation enhancement processing mode for a current block, the bitstream is parsed to determine first motion information of the current block. A first matching block of the current block is determined according to the first motion information, and motion compensation enhancement is performed on the first matching block to obtain at least one second matching block.

A first prediction block of the current block is determined according to the first motion information and at least one second matching block. A reconstruction block of the current block is determined according to the first prediction block. In this way, when it is obtained by decoding that motion compensation enhancement processing mode is used for the current block. In this case, the motion compensation enhancement is performed by using the preset neural network model, not only the computational complexity can be reduced, but also the bit rate can be saved on the premise of ensuring the same decoding quality, thus improving the encoding and decoding efficiency.

Figure 8:
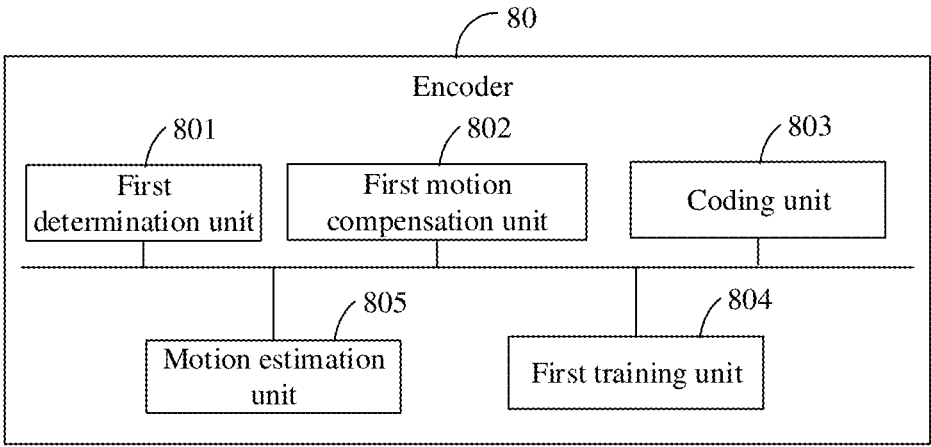
FIG. 8 is a schematic diagram of a composition structure of an encoder provided by an embodiment of the present disclosure.

In yet another embodiment of the present disclosure, based on the same inventive concept as the previous embodiments, referring to FIG. 8, a schematic diagram of the composition structure of an encoder 80 provided by an embodiment of the present disclosure is illustrated. As illustrated in FIG. 8, the encoder 80 may include a first determination unit 801, a first motion compensation unit 802 and a coding unit 803.

The first determination unit 801 is configured to determine a first matching block of a current block.

The first motion compensation unit 802 is configured to perform motion compensation enhancement on the first matching block to obtain at least one second matching block.

The first determination unit 801 is further configured to determine motion information of the current block according to the at least one second matching block.

The coding unit 803 is configured to encode the current block according to the motion information.

In some embodiments, the first motion compensation unit 802 is specifically configured to perform super-resolution and quality enhancement processing on the first matching block to obtain a processed block, and perform first filtering process on the processed block to obtain the at least one second matching block. A resolution of the second matching block obtained after the first filtering processing is the same as the resolution of the current block.

In some embodiments, the first filtering processing includes down-sampling.

In some embodiments, the first motion compensation unit 802 is further configured to perform the motion compensation enhancement on the first matching block by using a preset neural network model. The preset neural network model includes a feature extraction module, a residual projection module group, a sampling module and a reconstruction module, and the feature extraction module, the residual projection module group, the sampling module and the reconstruction module are connected in sequence.

Accordingly, the first motion compensation unit 802 is further configured to perform shallow feature extraction on the first matching block by the feature extraction module to obtain first feature information, perform residual feature learning on the first feature information by the residual projection module group to obtain second feature information, perform second filtering processing on the second feature information by the sampling module to obtain third feature information, and perform super-resolution reconstruction on the third feature information by the reconstruction module to obtain the processed block.

In some embodiments, the feature extraction module includes a first convolution layer. Accordingly, the first motion compensation unit 802 is further configured to perform convolution operation on the first matching block by the first convolution layer to obtain the first feature information.

In some embodiments, the residual projection module group includes N residual projection blocks, a second convolution layer and a first connection layer. The N residual projection blocks, the second convolution layer and the first connection layer are connected in sequence. The first connection layer is further connected to an input of a first one of the N residual projection blocks.

Accordingly, the first motion compensation unit 802 is further configured to perform the residual feature learning on the first feature information by the N residual projection blocks to obtain first intermediate feature information, where N is an integer greater than or equal to 1, perform convolution operation on the first intermediate feature information by the second convolution layer to obtain second intermediate feature information, and adding the first feature information and the second intermediate feature information by the first connection layer to obtain the second feature information.

In some embodiments, the N residual projection blocks are in a cascaded structure. An input of the cascaded structure is the first feature information, and an output of the cascaded structure is the second intermediate feature information.

In some embodiments, the first motion compensation unit 802 is further configured to: in response to N being equal 1, input the first feature information into the first residual projection block to obtain output information of the first residual projection block and determine the output information of the first residual projection block as the first intermediate feature information, and in response to N being greater than 1, after the output information of the first residual projection block is obtained, input output information of a d-th residual projection block into a (d+1)-th residual projection block to obtain output information of the (d+1)-th residual projection block, increment d by 1 until output information of an N-th residual projection block is obtained, and determine the output information of the N-th residual projection block as the first intermediate feature information, where d is an integer greater than or equal to 1 and less than N.

In some embodiments, the residual projection block includes an up-projection module, M residual modules, a local feature fusion module, a down-projection module and a second connection layer. The up-projection module, the M residual modules, the local feature fusion module, the down-projection module and the second connection layer are connected in sequence, and the second connection layer is further connected to an input of the up-projection module, and outputs of the M residual modules are respectively connected to the local feature fusion module.

Accordingly, the first motion compensation unit 802 is further configured to perform third filtering processing on input information of the residual projection block by the up-projection module to obtain the first high-resolution feature information, learn different levels of high-resolution features from the first high-resolution feature information by the M residual modules to obtain M pieces of second high-resolution feature information, where M is an integer greater than or equal to 1, perform fusion operation on the M pieces of second high-resolution feature information by the local feature fusion module to obtain third high-resolution feature information, perform fourth filtering processing on the third high-resolution feature information by the down-projection module to obtain filtered feature information, and add the input information and the filtered feature information by the second connection layer to obtain output information of the residual projection block.

In some embodiments, the up-projection module includes a transposed convolution layer. Accordingly, the first motion compensation unit 802 is further configured to perform the third filtering processing on the input information of the residual projection block by the transposed convolution layer to obtain the first high-resolution feature information. A resolution of the first high-resolution feature information obtained after the third filtering processing is higher than a resolution of the input information of the residual projection block.

In some embodiments, the third filtering processing includes up-sampling.

In some embodiments, the local feature fusion module includes a feature fusion layer and a third convolution layer. Accordingly, the first motion compensation unit 802 is further configured to perform the fusion operation on the M pieces of second high-resolution feature information by the feature fusion layer to obtain fusion feature information, and perform convolution operation on the fusion feature information by the third convolution layer to obtain the third high-resolution feature information.

In some embodiments, the down-projection module includes a fourth convolution layer. Accordingly, the first motion compensation unit 802 is further configured to perform the fourth filtering processing on the third high-resolution feature information by the fourth convolution layer to obtain the filtered feature information. A resolution of the filtered feature information obtained after the fourth filtering processing is lower than a resolution of the third high-resolution feature information.

In some embodiments, the fourth filtering process includes down-sampling.

In some embodiments, the sampling module includes a sub-pixel convolution layer. Accordingly, the first motion compensation unit 802 is further configured to perform the second filtering processing on the second feature information by the sub-pixel convolution layer to obtain the third feature information. A resolution of the third feature information obtained after the second filtering processing is higher than a resolution of the second feature information.

In some embodiments, the second filtering processing includes up-sampling.

In some embodiments, the reconstruction module includes a fifth convolution layer. Accordingly, the first motion compensation unit 802 is further configured to perform convolution operation on the third feature information by the fifth convolution layer to obtain the processed block.

In some embodiments, referring to FIG. 8, the encoder 80 may further include a first training unit 804. The first training unit 804 is configured to determine a training data set, the training data set including at least one training picture, preprocess the training data set to obtain ground truths of the preset neural network model and at least one input picture group, wherein the input picture group includes at least one input picture, and train the neural network model based on the ground truths by using the at least one input picture group to obtain at least one group of candidate model parameters, the ground truths being used for determining a loss value of a loss function of the neural network model, and the at least one group of candidate model parameters being obtained when the loss value of the loss function converges to a preset threshold.

In some embodiments the first determination unit 801 is further configured to determine a quantization parameter of the current block, determine, according to the quantization parameter, a model parameter corresponding to the quantization parameter from the at least one group of candidate model parameters, and determine the preset neural network model according to the model parameter. In response to the at least one group being multiple groups, the at least one input picture group corresponds to different quantization parameters, and the multiple groups of candidate model parameters correspond to different quantization parameters.

In some embodiments, the coding unit 803 is further configured to encode the model parameter, and signal encoded bits.

In some embodiments, referring to FIG. 8, the encoder 80 may further include a motion estimation unit 805. The motion estimation unit 805 is configured to perform integer-pixel motion estimation on the current block to determine the first matching block of the current block. The first matching block is a matching block with a minimum rate distortion cost when motion estimation is performed on the current block at integer pixel positions.

The first motion compensation unit 802 is further configured to perform fractional pixel motion compensation on the first matching block by using the preset neural network model to obtain the at least one second matching block.

In some embodiments, the motion estimation unit 805 is further configured to perform the sub-pixel motion estimation on the current block according to the at least one second matching block to determine a sub-pixel matching block of the current block. The sub-pixel matching block is a matching block with minimum rate distortion cost when motion estimation is performed on the current block at sub-pixel positions.

The first determination unit 801 is further configured to perform pre-encoding processing on the current block by using the first matching block to determine a first rate distortion cost, perform pre-encoding processing on the current block by using the sub-pixel matching block to determine a second rate distortion cost, in response to the first rate distortion cost being greater than the second rate distortion cost, determine to use a motion compensation enhancement processing mode for the current block, and determine the motion information as first motion information, the first motion information being used for pointing to a sub-pixel position, and in response to the first rate distortion cost being less than or equal to the second rate distortion cost, determine not to use the motion compensation enhancement processing mode for the current block, and determine the motion information as second motion information, the second motion information being used for pointing to an integer pixel position.

In some embodiments, the first determination unit 801 is further configured to in response to the first rate distortion cost being greater than the second rate distortion cost, determine a value of first syntax element identification information to be a first value, and in response to the first rate distortion cost being less than or equal to the second rate distortion cost, determine the value of the first syntax element identification information to be a second value. The first syntax element identification information is for indicating whether to use the motion compensation enhancement processing mode for the current block.

In some embodiments, the coding unit 803 is further configured to encode the value of the first syntax element identification information, and signal encoded bits.

In some embodiments, the coding unit 803 is further configured to: in response to using the motion compensation enhancement processing mode for the current block, determine a first prediction block of the current block according to the first motion information and the sub-pixel matching block, determine a residual block of the current block according to the current block and the first prediction block, and encode the residual block, and signal encoded bits.

Alternatively, the coding unit 803 is further configured to: in response to not using the motion compensation enhancement processing mode for the current block, determine a second prediction block of the current block according to the second motion information and the first matching block, determine a residual block of the current block according to the current block and the second prediction block, and encode the residual block, and signal encoded bits.

In some embodiments, the coding unit 803 is further configured to encode the motion information, and signal encoded bits.

It should be understood that in embodiments of the present disclosure, the "unit" may be part of a circuit, part of a processor, part of programs or software, etc., of course it may also be a module, or it may be non-modular. Moreover, various components in the present embodiment may be integrated in one processing unit, each unit may exist physically alone, or two or more units may be integrated in one unit. The above integrated unit may be realized either in the form of hardware or in the form of software function module.

The integrated unit may be stored in a computer readable storage medium if implemented in the form of software functional modules and sold or used as a stand-alone product. Based on this understanding, the technical solutions of the present disclosure, in essence or the part that contributes to the prior art or part of the technical solutions, may be embodied in the form of a software product. The computer software product is stored in a storage medium and includes instructions that causes a computer device (which may be a personal computer, a server, a network device, etc.) to perform all or part of the operations of the method described in various embodiments of the present disclosure. The aforementioned storage medium includes a U disk, a removable hard disk, an Read Only Memory (ROM), an Random Access Memory (RAM), a magnetic disk or an optical disk and other mediums capable of storing program codes.

Thus, the embodiments of the present disclosure provide a computer storage medium applied to the encoder 80. The computer storage medium stores computer programs that implement the method of any of the above embodiments when executed by a first processor.

Figure 9:
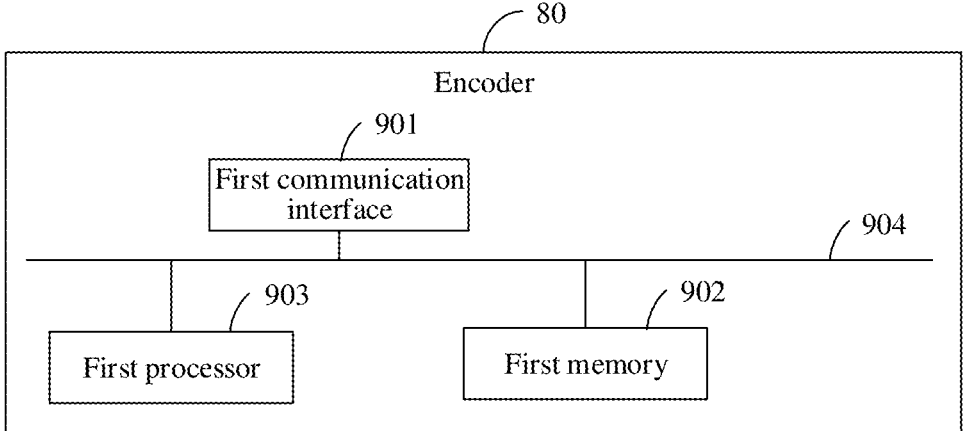
FIG. 9 is a schematic diagram of a specific hardware structure of an encoder provided by an embodiment of the present disclosure.

Based on the above composition of the encoder 80 and the computer storage medium, referring to FIG. 9, a schematic diagram of a specific hardware structure of the encoder 80 provided by an embodiment of the present disclosure is illustrated. As illustrated in FIG. 9, the encoder 80 may include a first communication interface 901, a first memory 902 and a first processor 903. Various components are coupled together by a first bus system 904. It should be understood that the first bus system 904 is used to implement connection communication between these components. The first bus system 904 includes a power bus, a control bus and a status signal bus in addition to a data bus. However, for clarity, the various buses are designated as the first bus system 904 in FIG. 9.

The first communication interface 901 is used for receiving and transmitting signals in the process of transmitting and receiving information with other external network elements.

The first memory 902 is configured to store computer programs capable of running on the first processor 903.

The first processor 903 is configured to perform the following operations when the computer programs are running.

A first matching block of a current block is determined.

Motion compensation enhancement is performed on the first matching block to obtain at least one second matching block.

Motion information of the current block is determined according to the at least one second matching block.

The current block is encoded according to the motion information.

It is understood that the first memory 902 in embodiments of the present disclosure may be a volatile memory or non-volatile memory, or may include both the volatile memory and non-volatile memory. The non-volatile memory may be an ROM, a Programmable ROM (PROM), an Erasable PROM (EPROM), an Electrically EPROM (EEPROM), or a flash memory. The volatile memory may be a Random Access Memory (RAM) which serves as an external cache. By way of illustration but not limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the first memory 902 of the system and method described in the present disclosure is intended to include but not limited to these and any other suitable types of memories.

The first processor 903 may be an integrated circuit chip having signal processing capability. In implementation, the various steps of the above method embodiments may be accomplished by integrated logic circuitry of hardware in the processor or instructions in the form of software. The above first processor 903 may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components, and may implement or perform the methods, steps and logic block diagrams disclosed in embodiments of the present disclosure. The general purpose processor may be a microprocessor or the processor may be any conventional processor or the like. The steps of the method disclosed in combination with the embodiments of the present disclosure may be directly embodied through execution of the hardware decoding processor or execution of the hardware combined with software modules in the decoding processor. The software modules may be located in a random memory, a flash memory, a ROM, a PROM, an electrically erasable programmable memory, a register and other storage mediums mature in the art. The storage medium is located in the first memory 902, and the first processor 903 reads information from the first memory 902 and completes the steps of the method in combination with its hardware.

It should be understood that the embodiments described in the present disclosure may be implemented in hardware, software, firmware, middleware, microcode or a combination thereof. For hardware implementation, the processing unit may be implemented in one or more ASIC, DSP, DSP Device (DSPD), Programmable Logic Devices (PLD), Field-Programmable Gate Array (FPGA), general purpose processor, controller, microcontroller, microprocessor, other electronic units for performing the functions described herein, or combinations thereof. For software implementations, the techniques described in the present disclosure may be implemented by modules (e.g. procedures, functions, etc.) that perform the functions described in the present disclosure. The software code may be stored in memory and executed by a processor. The memory may be implemented in the processor or outside the processor.

Alternatively, as another embodiment, the first processor 903 is further configured to perform the method described in any of the above embodiments when the computer programs are running.

The present embodiment provides an encoder. The encoder may include a first determination unit, a first motion compensation unit and a coding unit. In this way, not only the computational complexity can be reduced, but also the bit rate can be saved on the premise of ensuring the same decoding quality, thus improving the encoding and decoding efficiency.

Figure 10:
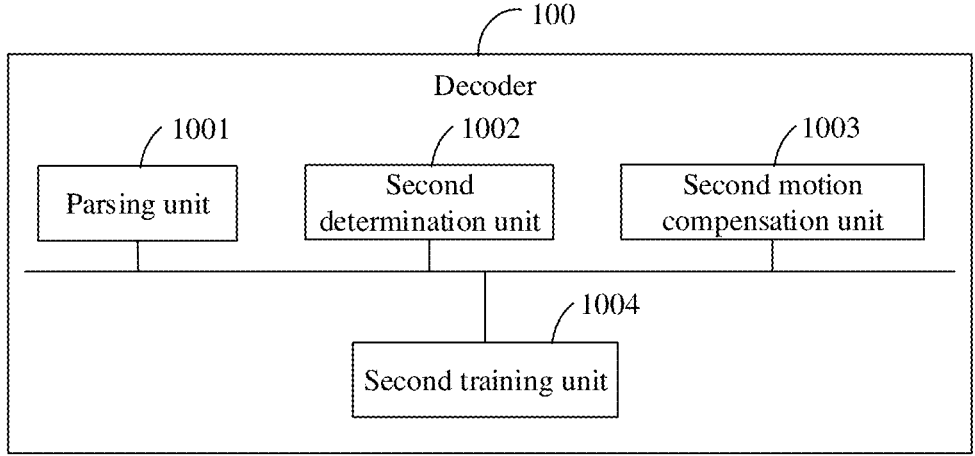
FIG. 10 is a schematic diagram of a composition structure of a decoder provided by an embodiment of the present disclosure.

In yet another embodiment of the present disclosure, based on the same inventive concept as the previous embodiments, referring to FIG. 10, a schematic diagram of the composition structure of a decoder 100 provided by an embodiment of the present disclosure is illustrated. As illustrated in FIG. 10, the decoder 100 may include a parsing unit 1001, a second determination unit 1002, and a second motion compensation unit 1003.

The parsing unit 1001 is configured to parse a bitstream to determine a value of first syntax element identification information.

The parsing unit 1001 is further configured to, in response to the first syntax element identification information indicating using a motion compensation enhancement processing mode for a current block, parse the bitstream to determine first motion information of the current block.

The second motion compensation unit 1003 is configured to determine a first matching block of the current block according to the first motion information, and perform motion compensation enhancement on the first matching block to obtain at least one second matching block.

The second determination unit 1002 is configured to determine a first prediction block of the current block according to the first motion information and the at least one second matching block, and determine a reconstruction block of the current block according to the first prediction block.

In some embodiments, the parsing unit 1001 is further configured to parse the bitstream to obtain a residual block of the current block.

Accordingly, the second determination unit 1002 is further configured to determine the reconstruction block of the current block according to the residual block and the first prediction block.

In some embodiments, the parsing unit 1001 is further configured to: in response to the first syntax element identification information indicating not using the motion compensation enhancement processing mode for the current block, parse the bitstream to obtain second motion information of the current block. The second motion information is used for pointing to an integer pixel position.

The second determination unit 1002 is further configured to determine a second prediction block of the current block according to the second motion information of the current block, and determine the reconstruction block of the current block according to the second prediction block.

In some embodiments, the parsing unit 1001 is further configured to parse the bitstream to obtain a residual block of the current block.

Accordingly, the second determination unit 1002 is further configured to determine the reconstruction block of the current block according to the residual block and the second prediction block.

In some embodiments, the second determination unit 1002 is further configured to: in response to the value of the first syntax element identification information being a first value, determine to use the motion compensation enhancement processing mode for the current block, or in response to the value of the first syntax element identification information being a second value, determine not to use the motion compensation enhancement processing mode for the current block.

In some embodiments, the second motion compensation unit 1003 is specifically configured to perform super-resolution and quality enhancement processing on the first matching block to obtain a processed block, where a resolution of the processed block is higher than a resolution of the current block, and perform first filtering processing on the processed block to obtain the at least one second matching block, where a resolution of the second matching block obtained after the first filtering processing is the same as the resolution of the current block.

In some embodiments, the first filtering process includes down-sampling.

In some embodiments, the second motion compensation unit 1003 is further configured to perform the motion compensation enhancement on the first matching block by using a preset neural network model. The preset neural network model includes a feature extraction module, a residual projection module group, a sampling module and a reconstruction module, and the feature extraction module, the residual projection module group, the sampling module and the reconstruction module are connected in sequence.

Accordingly, the second motion compensation unit 1003 is further configured to perform shallow feature extraction on the first matching block by the feature extraction module to obtain first feature information, perform residual feature learning on the first feature information by the residual projection module group to obtain second feature information, perform second filtering processing on the second feature information by the sampling module to obtain third feature information, and perform super-resolution reconstruction on the third feature information by the reconstruction module to obtain the processed block.

In some embodiments, the feature extraction module is a first convolution layer. Accordingly, the second motion compensation unit 1003 is further configured to perform convolution operation on the first matching block by the first convolution layer to obtain the first feature information.

In some embodiments, the residual projection module group includes N residual projection blocks, a second convolution layer and a first connection layer. The N residual projection blocks, the second convolution layer and the first connection layer are connected in sequence, and the first connection layer is further connected to an input of a first one of the N residual projection blocks.

Accordingly, the second motion compensation unit 1003 is further configured to perform the residual feature learning on the first feature information by the N residual projection blocks to obtain first intermediate feature information, where N is an integer greater than or equal to 1, perform convolution operation on the first intermediate feature information by the second convolution layer to obtain second intermediate feature information, and add the first feature information and the second intermediate feature information by the first connection layer to obtain the second feature information.

In some embodiments, the N residual projection blocks are in a cascaded structure. An input of the cascaded structure is the first feature information, and an output of the cascaded structure is the second intermediate feature information.

In some embodiments, the second motion compensation unit 1003 is further configured to: in response to N being equal 1, input the first feature information into the first residual projection block to obtain output information of the first residual projection block and determine the output information of the first residual projection block as the first intermediate feature information, and in response to N being greater than 1, after the output information of the first residual projection block is obtained, input output information of a d-th residual projection block into a (d+1)-th residual projection block to obtain output information of the (d+1)-th residual projection block, increment d by 1 until output information of an N-th residual projection block is obtained, and determine the output information of the N-th residual projection block as the first intermediate feature information, where d is an integer greater than or equal to 1 and less than N.

In some embodiments, the residual projection block includes an up-projection module, M residual modules, a local feature fusion module, a down-projection module and a second connection layer. The up-projection module, the M residual modules, the local feature fusion module, the down-projection module and the second connection layer are connected in sequence, and the second connection layer is further connected to an input of the up-projection module, and outputs of the M residual modules are respectively connected to the local feature fusion module.

Accordingly, the second motion compensation unit 1003 is further configured to perform third filtering processing on input information of the residual projection block by the up-projection module to obtain the first high-resolution feature information, learn different levels of high-resolution features from the first high-resolution feature information by the M residual modules to obtain M pieces of second high-resolution feature information, where M is an integer greater than or equal to 1, perform fusion operation on the M pieces of second high-resolution feature information by the local feature fusion module to obtain third high-resolution feature information, perform fourth filtering processing on the third high-resolution feature information by the down-projection module to obtain filtered feature information, and add the input information and the filtered feature information by the second connection layer to obtain output information of the residual projection block.

In some embodiments, the up-projection module includes a transposed convolution layer. Accordingly, the second motion compensation unit 1003 is further configured to perform the third filtering processing on the input information of the residual projection block by the transposed convolution layer to obtain the first high-resolution feature information. A resolution of the first high-resolution feature information obtained after the third filtering processing is higher than a resolution of the input information of the residual projection block.

In some embodiments, the third filtering process includes up-sampling.

In some embodiments, the local feature fusion module includes a feature fusion layer and a third convolution layer. Accordingly, the second motion compensation unit 1003 is further configured to perform the fusion operation on the M pieces of second high-resolution feature information by the feature fusion layer to obtain fusion feature information, and perform convolution operation on the fusion feature information by the third convolution layer to obtain the third high-resolution feature information.

In some embodiments, the down-projection module includes a fourth convolution layer. Accordingly, the second motion compensation unit 1003 is further configured to perform the fourth filtering processing on the third high-resolution feature information by the fourth convolution layer to obtain the filtered feature information. A resolution of the filtered feature information obtained after the fourth filtering processing is lower than a resolution of the third high-resolution feature information.

In some embodiments, the fourth filtering process includes down-sampling.

In some embodiments, the sampling module includes a sub-pixel convolution layer. Accordingly, the second motion compensation unit 1003 is further configured to perform the second filtering processing on the second feature information by the sub-pixel convolution layer to obtain the third feature information. A resolution of the third feature information obtained after the second filtering processing is higher than a resolution of the second feature information.

In some embodiments, the second filtering processing includes up-sampling.

In some embodiments, the reconstruction module includes a fifth convolution layer. Accordingly, the second motion compensation unit 1003 is further configured to perform convolution operation on the third feature information by the fifth convolution layer to obtain the processed block.

In some embodiments, referring to FIG. 10, the decoder 100 may further include a second training unit 1004. The second training unit 1004 is configured to determine a training data set, the training data set including at least one training picture, preprocess the training data set to obtain ground truths of the preset neural network model and at least one input picture group, wherein the input picture group includes at least one input picture, and train the neural network model based on the ground truths by using the at least one input picture group to obtain at least one group of candidate model parameters, the ground truths being used for determining a loss value of a loss function of the neural network model, and the at least one group of candidate model parameters being obtained when the loss value of the loss function converges to a preset threshold.

In some embodiments, the second determination unit 1002 is further configured to determine a quantization parameter of the current block, determine, according to the quantization parameter, a model parameter corresponding to the quantization parameter from the at least one group of candidate model parameters, and determine the preset neural network model according to the model parameter. In response to the at least one group being multiple groups, the at least one input picture group corresponds to different quantization parameters, and the multiple groups of candidate model parameters correspond to different quantization parameters.

In some embodiments, the parsing unit 1001 is further configured to parse the bitstream to obtain a model parameter.

The second determination unit 1002 is further configured to determine the preset neural network model according to the model parameter.

It should be understood that in the present embodiment, the "unit" may be part of a circuit, part of a processor, part of programs or software, etc., of course it may also be a module, or it may be non-modular. Moreover, various components in the present embodiment may be integrated in one processing unit, each unit may exist physically alone, or two or more units may be integrated in one unit. The above integrated unit may be realized either in the form of hardware or in the form of software function module.

The integrated unit may be stored in a computer readable storage medium if implemented in the form of software functional modules and sold or used as a stand-alone product. Based on this understanding, the present embodiment provides a computer storage medium applied to the decoder 100. The computer storage medium stores computer programs that implement the method of any of the above embodiments when executed by a second processor.

Figure 11:
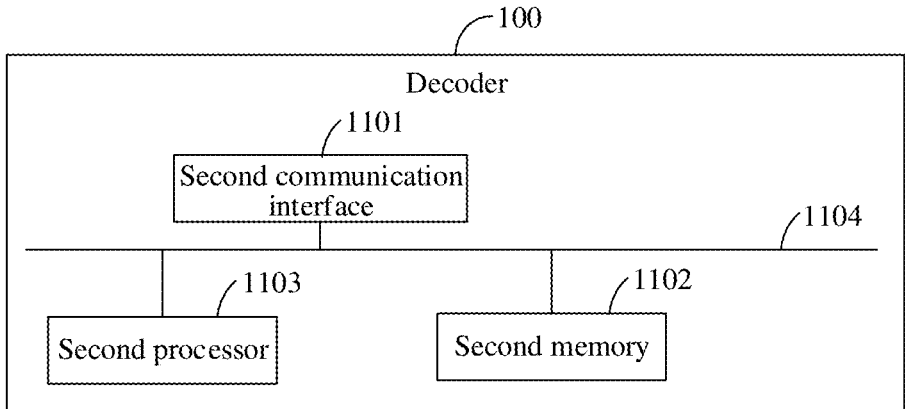
FIG. 11 is a schematic diagram of a specific hardware structure of a decoder provided by an embodiment of the present disclosure.

Based on the above composition of the decoder 100 and the computer storage medium, referring to FIG. 11, a schematic diagram of a specific hardware structure of the decoder 100 provided by an embodiment of the present disclosure is illustrated. As illustrated in FIG. 11, the decoder 100 may include a second communication interface 1101, a second memory 1102 and a second processor 1103. Various components are coupled together by a second bus system 1104. It should be understood that the second bus system 1104 is used to implement connection communication between these components. The second bus system 1104 includes a power bus, a control bus and a status signal bus in addition to a data bus. However, for clarity, the various buses are designated as the second bus system 1104 in FIG. 11.

The second communication interface 1101 is used for receiving and transmitting signals in the process of transmitting and receiving information with other external network elements.

The second memory 1102 is configured to store computer programs capable of running on the second processor 1103.

The second processor 1103 is configured to perform the following operations when the computer programs are running.

The bitstream is parsed to determine a value of first syntax element identification information.

In response to the first syntax element identification information indicating using a motion compensation enhancement processing mode for a current block, the bitstream is parsed to determine first motion information of the current block.

A first matching block of the current block is determined according to the first motion information, and motion compensation enhancement is performed on the first matching block to obtain at least one second matching block.

A first prediction block of the current block is determined according to the first motion information and the at least one second matching block.

A reconstruction block of the current block is determined according to the first prediction block.

Alternatively, as another embodiment, the second processor 1103 is further configured to perform the method described in any of the above embodiments when the computer programs are running.

It should be understood that the second memory 1102 is similar in hardware function to the first memory 902, and the second processor 1103 is similar in hardware function to the first processor 903, which will not be elaborated herein again.

The present embodiment provides a decoder. The decoder may include a parsing unit, a second determination unit and a second motion compensation unit. In this way, when it is obtained by decoding that motion compensation enhancement processing mode is used for the current block, not only the computational complexity can be reduced, but also the bit rate can be saved on the premise of ensuring the same decoding quality, thus improving the encoding and decoding efficiency.

It is to be noted that, in the present disclosure, the terms "including", "comprising" or any other variation thereof are intended to encompass non-exclusive inclusion, such that a process, method, object or apparatus including a set of elements includes not only those elements but also other elements not explicitly listed, or also elements inherent to such a process, method, object or apparatus. In the absence of further limitations, an element defined by the phrase "includes a . . . " does not preclude the existence of another identical element in the process, method, object or apparatus in which it is included.

The above serial numbers of the embodiments of the present disclosure are for description only and do not represent the advantages and disadvantages of the embodiments.

The methods disclosed in several method embodiments provided in the present disclosure may be arbitrarily combined without conflict to obtain new method embodiments.

The features disclosed in several product embodiments provided in the present disclosure may be arbitrarily combined without conflict to obtain new product embodiments.

The features disclosed in several methods or apparatus embodiments provided in the present disclosure may be arbitrarily combined without conflict to obtain new method embodiments or apparatus embodiments.

The above description is only the specific embodiments of the present disclosure, but the scope of protection of the present disclosure is not limited thereto. Any person skilled in the art familiar with the technical filed may easily conceive changes or substitutions that are covered within the scope of protection of the present disclosure. Therefore, the protection scope of the present disclosure should be defined by the protection scope of the claims.

INDUSTRIAL PRACTICALITY

In the embodiments of the present disclosure, on the encoder side, a first matching block of a current block is determined, motion compensation enhancement is performed on the first matching block to obtain at least one second matching block, motion information of the current block is determined according to the at least one second matching block, and the current block is encoded according to the motion information. On the decoder side, a bitstream is parsed to determine a value of the first syntax element identification information, if the first syntax element identification information indicates using a motion compensation enhancement processing mode for the current block, the bitstream is parsed to determine first motion information of the current block, a first matching block of the current block is determined according to the first motion information, motion compensation enhancement is performed on the first matching block to obtain at least one second matching block, a first prediction block of the current block is determined according to the first motion information and at least one second matching block, and a reconstruction block of the current block is determined according to the first prediction block. In this way, for both the encoder and the decoder, by performing motion compensation enhancement on the first matching block, not only the computational complexity can be reduced, but also the bit rate can be saved on the premise of ensuring the same decoding quality, thus improving the encoding and decoding efficiency.

The invention claimed is:

1. An encoding method, applied to an encoder, the method comprising:

determining a first matching block of a current block;

performing motion compensation enhancement on the first matching block to obtain at least one second matching block;

determining motion information of the current block according to the at least one second matching block; and encoding the current block according to the motion information, setting a first syntax element identification information, wherein the first syntax element identification information is for indicating whether to use a motion compensation enhancement processing mode for the current block; and encoding a value of the first syntax element identification information, and signalling encoded bits, wherein the value of the first syntax element identification information is set to be a first value to indicate that the motion compensation enhancement processing mode is used for the current block, and the value of the first syntax element identification information is set to be a second value to indicate that the motion compensation enhancement processing mode is not used for the current block.

2. The method of claim 1, wherein performing the motion compensation enhancement on the first matching block to obtain the at least one second matching block comprises:

performing super-resolution and quality enhancement processing on the first matching block to obtain a processed block, wherein a resolution of the processed block is higher than a resolution of the current block; and performing first filtering processing on the processed block to obtain the at least one second matching block, wherein a resolution of the second matching block obtained after the first filtering processing is the same as the resolution of the current block.

3. The method of claim 2, wherein performing the motion compensation enhancement on the first matching block further comprises: performing the motion compensation enhancement on the first matching block by using a preset neural network model, wherein the preset neural network model comprises a feature extraction module, a residual projection module group, a sampling module and a reconstruction module, and the feature extraction module, the residual projection module group, the sampling module and the reconstruction module are connected in sequence, wherein performing the super-resolution and quality enhancement processing on the first matching block to obtain the processed block comprises:

performing shallow feature extraction on the first matching block by the feature extraction module to obtain first feature information;

performing residual feature learning on the first feature information by the residual projection module group to obtain second feature information;

performing second filtering processing on the second feature information by the sampling module to obtain third feature information; and performing super-resolution reconstruction on the third feature information by the reconstruction module to obtain the processed block.

4. The method of claim 1, further comprising:

determining a training data set, the training data set comprising at least one training picture;

preprocessing the training data set to obtain ground truths of the preset neural network model and at least one input picture group, wherein the input picture group comprises at least one input picture; and training the neural network model based on the ground truths by using the at least one input picture group to obtain at least one group of candidate model parameters, wherein the ground truths are used for determining a loss value of a loss function of the neural network model, and the at least one group of candidate model parameters are obtained when the loss value of the loss function converges to a preset threshold.

5. The method of claim 4, further comprising:

determining a quantization parameter of the current block;

determining, according to the quantization parameter, a model parameter corresponding to the quantization parameter from the at least one group of candidate model parameters; and determining the preset neural network model according to the model parameter, wherein in response to the at least one group being a plurality of groups, the at least one input picture group corresponds to different quantization parameters, and the plurality of groups of candidate model parameters correspond to different quantization parameters.

6. The method of claim 3, wherein determining the first matching block of the current block comprises:

performing integer-pixel motion estimation on the current block to determine the first matching block of the current block, wherein the first matching block is a matching block with a minimum rate distortion cost when motion estimation is performed on the current block at integer pixel positions;

wherein performing the motion compensation enhancement on the first matching block to obtain the at least one second matching block comprises:

performing fractional pixel motion compensation on the first matching block by using the preset neural network model to obtain the at least one second matching block.

7. The method of claim 6, further comprising: after the at least one second matching block is obtained, performing the sub-pixel motion estimation on the current block according to the at least one second matching block to determine a sub-pixel matching block of the current block, the sub-pixel matching block being a matching block with minimum rate distortion cost when motion estimation is performed on the current block at sub-pixel positions;

wherein determining the motion information of the current block according to the at least one second matching block comprises:

performing pre-encoding processing on the current block by using the first matching block to determine a first rate distortion cost;

performing pre-encoding processing on the current block by using the sub-pixel matching block to determine a second rate distortion cost;

in response to the first rate distortion cost being greater than the second rate distortion cost, determining to use the motion compensation enhancement processing mode for the current block, and determining the motion information as first motion information, the first motion information being used for pointing to a sub-pixel position; and in response to the first rate distortion cost being less than or equal to the second rate distortion cost, determining not to use the motion compensation enhancement processing mode for the current block, and determining the motion information as second motion information, the second motion information being used for pointing to an integer pixel position.

8. The method of claim 7, further comprising:

in response to the first rate distortion cost being greater than the second rate distortion cost, determining the value of first syntax element identification information to be the first value; and in response to the first rate distortion cost being less than or equal to the second rate distortion cost, determining the value of the first syntax element identification information to be the second value.

9. The method of claim 7, wherein encoding the current block according to the motion information comprises:

in response to using the motion compensation enhancement processing mode for the current block, determining a first prediction block of the current block according to the first motion information and the sub-pixel matching block, determining a residual block of the current block according to the current block and the first prediction block, and encoding the residual block, and signalling encoded bits; or, in response to not using the motion compensation enhancement processing mode for the current block, determining a second prediction block of the current block according to the second motion information and the first matching block, determining a residual block of the current block according to the current block and the second prediction block, and encoding the residual block, and signalling encoded bits.

10. A bitstream, generated by bit encoding according to information to be encoded according to the encoding method of claim 1, wherein the information to be encoded at least comprises motion information of a current block, a residual block of the current block and a value of first syntax element identification information, the first syntax element identification information being for indicating whether to use motion compensation enhancement processing mode for the current block.

11. An encoder, comprising a first memory and a first processor, wherein the first memory is configured to store computer instructions executable by the first processor; and the first processor is configured to perform the method of claim 1 when executing the computer instructions.

12. A decoding method, applied to a decoder, the method comprising:

parsing a bitstream to determine a value of first syntax element identification information;

in response to the first syntax element identification information indicating using a motion compensation enhancement processing mode for a current block, parsing the bitstream to determine first motion information of the current block;

determining a first matching block of the current block according to the first motion information, and performing motion compensation enhancement on the first matching block to obtain at least one second matching block;

determining a first prediction block of the current block according to the first motion information and the at least one second matching block; and determining a reconstruction block of the current block according to the first prediction block, wherein parsing the bitstream to determine the value of the first syntax element identification information comprises:

in response to the value of the first syntax element identification information being a first value, determining to use the motion compensation enhancement processing mode for the current block; and in response to the value of the first syntax element identification information being a second value, determining not to use the motion compensation enhancement processing mode for the current block.

13. The method of claim 12, wherein performing the motion compensation enhancement on the first matching block to obtain the at least one second matching block comprises:

performing super-resolution and quality enhancement processing on the first matching block to obtain a processed block, wherein a resolution of the processed block is higher than a resolution of the current block; and performing first filtering processing on the processed block to obtain the at least one second matching block, wherein a resolution of the second matching block obtained after the first filtering processing is the same as the resolution of the current block.

14. The method of claim 13, wherein performing the motion compensation enhancement on the first matching block further comprises: performing the motion compensation enhancement on the first matching block by using a preset neural network model, wherein the preset neural network model comprises a feature extraction module, a residual projection module group, a sampling module and a reconstruction module, and the feature extraction module, the residual projection module group, the sampling module and the reconstruction module are connected in sequence;

wherein performing the super-resolution and quality enhancement processing on the first matching block to obtain the processed block comprises:

performing shallow feature extraction on the first matching block by the feature extraction module to obtain first feature information;

performing residual feature learning on the first feature information by the residual projection module group to obtain second feature information;

performing second filtering processing on the second feature information by the sampling module to obtain third feature information; and performing super-resolution reconstruction on the third feature information by the reconstruction module to obtain the processed block.

15. The method of claim 14, the residual projection module group comprises N residual projection blocks, a second convolution layer and a first connection layer, the N residual projection blocks, the second convolution layer and the first connection layer being connected in sequence, and the first connection layer being further connected to an input of a first one of the N residual projection blocks;

wherein performing the residual feature learning on the first feature information by the residual projection module group to obtain the second feature information comprises:

performing the residual feature learning on the first feature information by the N residual projection blocks to obtain first intermediate feature information, where N is an integer greater than or equal to 1;

performing convolution operation on the first intermediate feature information by the second convolution layer to obtain second intermediate feature information; and adding the first feature information and the second intermediate feature information by the first connection layer to obtain the second feature information.

16. The method of claim 15, wherein the N residual projection blocks are in a cascaded structure, an input of the cascaded structure is the first feature information, and an output of the cascaded structure is the second intermediate feature information, wherein performing the residual feature learning on the first feature information by the N residual projection blocks to obtain the first intermediate feature information comprises:

in response to N being equal to 1, inputting the first feature information into the first residual projection block to obtain output information of the first residual projection block, and determining the output information of the first residual projection block as the first intermediate feature information; and in response to N being greater than 1, after the output information of the first residual projection block is obtained, inputting output information of a d-th residual projection block into a (d+1)-th residual projection block to obtain output information of the (d+1)-th residual projection block, incrementing d by 1 until output information of an N-th residual projection block is obtained, and determining the output information of the N-th residual projection block as the first intermediate feature information, where d is an integer greater than or equal to 1 and less than N.

17. The method of claim 16, wherein the residual projection block comprises an up-projection module, M residual modules, a local feature fusion module, a down-projection module and a second connection layer, the up-projection module, the M residual modules, the local feature fusion module, the down-projection module and the second connection layer being connected in sequence, and the second connection layer being further connected to an input of the up-projection module, and outputs of the M residual modules being respectively connected to the local feature fusion module;

wherein the method further comprises:

performing third filtering processing on input information of the residual projection block by the up-projection module to obtain first high-resolution feature information;

learning different levels of high-resolution features from the first high-resolution feature information by the M residual modules to obtain M pieces of second high-resolution feature information, where M is an integer greater than or equal to 1;

performing fusion operation on the M pieces of second high-resolution feature information by the local feature fusion module to obtain third high-resolution feature information;

performing fourth filtering processing on the third high-resolution feature information by the down-projection module to obtain filtered feature information; and adding the input information and the filtered feature information by the second connection layer to obtain output information of the residual projection block.

18. The method of claim 17, wherein the up-projection module comprises a transposed convolution layer, and performing the third filtering processing on the input information of the residual projection block by the up-projection module to obtain the first high-resolution feature information comprises:

performing the third filtering processing on the input information of the residual projection block by the transposed convolution layer to obtain the first high-resolution feature information, wherein a resolution of the first high-resolution feature information obtained after the third filtering processing is higher than a resolution of the input information of the residual projection block.

19. The method of claim 17, wherein the local feature fusion module comprises a feature fusion layer and a third convolution layer, and performing the fusion operation on the M pieces of second high-resolution feature information by the local feature fusion module to obtain the third high-resolution feature information comprises:

performing the fusion operation on the M pieces of second high-resolution feature information by the feature fusion layer to obtain fusion feature information; and performing convolution operation on the fusion feature information by the third convolution layer to obtain the third high-resolution feature information.

20. The method of claim 17, wherein the down-projection module comprises a fourth convolution layer, and performing the fourth filtering processing on the third high-resolution feature information by the down-projection module to obtain the filtered feature information comprises:

performing the fourth filtering processing on the third high-resolution feature information by the fourth convolution layer to obtain the filtered feature information, wherein a resolution of the filtered feature information obtained after the fourth filtering processing is lower than a resolution of the third high-resolution feature information.

21. The method of claim 14, wherein the sampling module comprises a sub-pixel convolution layer, and performing the second filtering processing on the second feature information by the sampling module to obtain the third feature information comprises:

performing the second filtering processing on the second feature information by the sub-pixel convolution layer to obtain the third feature information, wherein a resolution of the third feature information obtained after the second filtering processing is higher than a resolution of the second feature information.

22. A decoder, comprising a second memory and a second processor, wherein the second memory is configured to store computer instructions executable by the second processor; and the second processor is configured to perform the method of claim 12 when executing the computer instructions.

* * * * *